(12) United States Patent
Akkarakaran et al.

(10) Patent No.: US 11,546,103 B2
(45) Date of Patent: Jan. 3, 2023

(54) PHYSICAL LAYER ASPECTS OF ROUND-TRIP TIME AND OBSERVED TIME DIFFERENCE OF ARRIVAL BASED POSITIONING

(71) Applicant: QUALCOMM Incorporated, San Diego, CA (US)

(72) Inventors: Sony Akkarakaran, Poway, CA (US); Tao Luo, San Diego, CA (US); Alexandros Manolakos, San Diego, CA (US); Joseph Binamira Soriaga, San Diego, CA (US); Naga Bhushan, San Diego, CA (US); Guttorm Ringstad Opshaug, Redwood City, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/656,519

(22) Filed: Oct. 17, 2019

(65) Prior Publication Data

US 2020/0127784 A1 Apr. 23, 2020

(30) Foreign Application Priority Data

Oct. 19, 2018 (GR) .............................. 20180100473

(51) Int. Cl.
*H04L 5/00* (2006.01)
*H04W 72/04* (2009.01)
(Continued)

(52) U.S. Cl.
CPC .......... *H04L 5/0048* (2013.01); *G01S 13/878* (2013.01); *H04L 5/0007* (2013.01);
(Continued)

(58) Field of Classification Search
CPC ....... H04W 4/02; H04W 4/022; H04W 4/023; H04W 4/025; H04W 4/027; H04W 64/00;
(Continued)

(56) References Cited

U.S. PATENT DOCUMENTS 9,155,084 B2 * 10/2015 Wang .................... H04L 5/0094
9,213,082 B2 * 12/2015 Aggarwal ............. G01S 13/765
(Continued)

OTHER PUBLICATIONS

3GPP TS 38.213: "3rd Generation Partnership Project; Technical Specification Group Radio Access Network; NR; Physical Layer Procedures for Control (Release 15)", 3GPP Standard; Technical Specification; 3GPP TS 38.213, 3rd Generation Partnership Project (3GPP), Mobile Competence Centre; 650, Route Des Lucioles; F-06921 Sophia-Antipolis Cedex; France, vol. RAN WG1, No. V15.3.0, Oct. 1, 2018 (Oct. 1, 2018), pp. 1-101, XP051487512, [retrieved on Oct. 1, 2018] section 11.1.1.*chapters 5. 7-7.5. 9.2.2*.
(Continued)

*Primary Examiner* — Jason E Mattis
(74) *Attorney, Agent, or Firm* — Qualcomm Incorporated

(57) ABSTRACT

Disclosed are techniques for scheduling uplink (UL) and downlink (DL) physical layer resources for a serving node and a user equipment (UE) for round trip time (RTT) and observed time difference of arrival (OTDOA) based positioning. In an aspect, a serving node and/or a network entity configure the UL and DL physical layer resources, and inform the UE. A network node transmits RTT measurement (RTTM) signal to the UE and receives RTT response (RTTR) signals from the UE. The network node measures the times the RTTM signals are transmitted and the times the RTTR signals are received. The UE provides to serving node processing times indicating a duration between the UE receiving the RTTM signals and the UE transmitting the RTTR signals. The RTTs are calculated from the times
(Continued)

measured by the network node and the processing times provided by the UE.

26 Claims, 19 Drawing Sheets

(51) Int. Cl.
  *G01S 13/87* (2006.01)
  *G01S 5/10* (2006.01)
(52) U.S. Cl.
  CPC ......... *H04L 5/0094* (2013.01); *H04W 72/042* (2013.01); *H04W 72/044* (2013.01); *G01S 5/10* (2013.01)
(58) Field of Classification Search
  CPC ............... H04W 24/10; H04W 56/004; H04W 72/04406; H04L 5/0048
  USPC ........................................ 370/310, 328, 529
  See application file for complete search history.

(56) References Cited

U.S. PATENT DOCUMENTS

| | | | | |
|---|---|---|---|---|
| 9,648,573 | B2* | 5/2017 | Siomina | H04W 56/001 |
| 9,713,117 | B2* | 7/2017 | Khoryaev | H04W 76/14 |
| 10,039,069 | B2* | 7/2018 | Lee | H04W 24/10 |
| 10,367,620 | B2* | 7/2019 | Iyer | H04L 5/005 |
| 10,848,256 | B2* | 11/2020 | Akkarakaran | H04B 17/104 |
| 10,863,313 | B2* | 12/2020 | Markhovsky | G01S 5/12 |
| 2009/0143065 | A1* | 6/2009 | Mattila | H04L 43/16 |
| | | | | 455/423 |
| 2013/0201941 | A1* | 8/2013 | Glasson | H04L 5/0012 |
| | | | | 370/329 |
| 2014/0098691 | A1* | 4/2014 | Kazmi | H04W 24/08 |
| | | | | 370/252 |
| 2018/0048452 | A1* | 2/2018 | Loehr | H04W 72/0413 |
| 2019/0305918 | A1* | 10/2019 | Siomina | H04W 76/36 |
| 2020/0127784 | A1* | 4/2020 | Akkarakaran | G01S 13/878 |
| 2020/0137607 | A1* | 4/2020 | Akkarakaran | H04W 56/009 |
| 2020/0205104 | A1* | 6/2020 | Akkarakaran | H04W 56/009 |
| 2020/0252241 | A1* | 8/2020 | Park | H04L 25/0226 |

OTHER PUBLICATIONS

"3rd Generation Partnership Project; Technical Specification Group Radio Access Network; NR; Medium Access Control (MAC) protocol specification (Release 15)", 3GPP Standard, Technical Specification, 3GPP TS 38.321, 3rd Generation Partnership Project (3GPP), Mobile Competence Centre, 650, Route Des Lucioles, F-06921 Sophia-Antipolis Cedex, France, vol. RAN WG2, No. V15.3.0, Sep. 25, 2018 (Sep. 25, 2018), pp. 1-76, XP051487371, [retrieved on Sep. 25, 2018] * chapter 6 1.3.17 *.

"3rd Generation Partnership Project; Technical Specification Group Radio Access Network; NR; Physical channels and modulation (Release 15)". 3GPP Standard; Technical Specification; 3GPP TS 38.211, 3rd Generation Partnership Project (3GPP), Mobile Competence Centre, 650, Route Des Lucioles, F-06921, Sophia-Antipolis Cedex, France, vol. RAN WG1, No. V15.3.0, Sep. 27, 2018 (Sep. 27, 2018), pp. 1-96, XP051487429, [retrieved on Sep. 27, 2018], *chapters 6.1.1. 6.4.1.4. 7.1.1. 7.4.1.5., 7.4.3*.

3rd Gen Partnership Project;Technical Specification Group Radio Access Network;NR;Radio Resource Control(RRC) protocol specification(Release 15), 3GPP Standard,Technical Specification;3GPP TS 38.331,3rd Gen Partnership Project(3GPP)Mobile Competence Centre,650,Route Des Lucioles,F-06921,Sophia-Antipolis Cedex,FR,vol. RAN WG2,No. V15.3.0,Sep. 26, 2018(Sep. 26, 2018)pp. 1-445,XP051487433[retrieved Sep. 26, 2018]chaps 5.5. 5.7.3.4,pp. 141-147,p. 156,pp. 180-197,pp. 221-225,pp. 232-234,pp. 261-264,pp. 268-271, pp. 330-337, pp. 339-340, pp. 349-350.

International Search Report and Written Opinion—PCT/US2019/057058—ISA/EPO—dated Feb. 17, 2020.

Qualcomm Incorporated: "Considerations on NR Positioning Using PRS", 3GPP Draft, R1-1811287, (OTDOA-RTT-PRS), 3rd Generation Partnership Project (3GPP), Mobile Competence Centre, 650, Route Des Lucioles; F-06921 Sophia-Antipolis Cedex, France, vol. RAN WG1, No. Chengdu, CN; Oct. 8, 2018-Oct. 12, 2018, Sep. 29, 2018 (Sep. 29, 2018), XP051518690, 4 Pages, Retrieved from the Internet: URL: https://www.3gpp.org/ftp/tsg_ran/WG1_RL1/TSGR1_94b/Docs/R1-1811287.zip [retrieved on Sep. 29, 2018], * chapters 2. 3.3. 3.5. 3.6. 4.

* cited by examiner

PHYSICAL LAYER ASPECTS OF ROUND-TRIP TIME AND OBSERVED TIME DIFFERENCE OF ARRIVAL BASED POSITIONING

CROSS-REFERENCE TO RELATED APPLICATION

The present application for patent claims priority under 35 U.S.C. § 119 to Greek Patent Application No. 20180100473, entitled "PHYSICAL LAYER ASPECTS OF ROUND-TRIP TIME AND OBSERVED TIME DIFFERENCE OF ARRIVAL BASED POSITIONING," filed Oct. 19, 2018, assigned to the assignee hereof, and expressly incorporated herein by reference in its entirety.

TECHNICAL FIELD

Various aspects described herein generally relate to wireless communication systems, and more particularly, to physical (PHY) layer aspects of round trip time (RTT) and observed time difference of arrival (OTDOA) based positioning.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station).

Where a transmitter uses beamforming to transmit RF signals, the beams of interest for data communication between the transmitter and receiver will be the beams carrying RF signals having the highest received signal strength (or highest received Signal to Noise plus Interference Ratio (SINR), for example, in the presence of a directional interfering signal). However, the receiver's ability to perform certain tasks may suffer when the receiver relies upon the beam with the highest received signal strength. For example, in a scenario where the beam with the highest received signal strength travels over a non-LOS (NLOS) path that is longer than the shortest path (i.e., a LOS path or a shortest NLOS path), the RF signals may arrive later than RF signal(s) received over the shortest path due to propagation delay. Accordingly, if the receiver is performing a task that requires precise timing measurements and the beam with the highest received signal strength is affected by longer propagation delay, then the beam with the highest received signal strength may not be optimal for the task at hand.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

An exemplary network node is disclosed. The network node comprises a transceiver, a memory, and a processor communicatively coupled with the transceiver and the memory. The processor, the memory, and the transceiver are configured to transmit a round trip time (RTT) measurement (RTTM) signal as a downlink (DL) positioning reference signal (PRS) on RTTM resources to a user equipment (UE). The RTTM signal comprises a RTTM waveform transmitted at a RTTM waveform transmit time. The processor, the memory, and the transceiver are also configured to receive a RTT response (RTTR) signal as an uplink (UL) PRS on RTTR resources from the UE. The RTTR signal is related to the RTTM signal and comprises an RTTR waveform and a RTTR payload. The RTTR waveform is received at a RTTR waveform arrival time. The RTTR payload comprise a UE processing time, which indicates a duration between the UE receiving the RTTM waveform and the UE transmitting the RTTR waveform. The processor, the memory, and the transceiver are further configured to determine a RTT between the UE and the network node based on the RTTM waveform transmit time, the RTTR waveform arrival time, and the UE processing time. A channel state information reference signal (CSI-RS) or a synchronization signal block (SSB) may be configured for use as the RTTM waveform. Alternatively or in addition thereto, a sounding reference signal (SRS) may be configured for use as the RTTR waveform.

An exemplary user equipment (UE) is disclosed. The UE comprises a transceiver, a memory, and a processor communicatively coupled with the transceiver and the memory. The processor, the memory, and the transceiver are configured to receive a round trip time (RTT) measurement (RTTM) signal as a downlink (DL) positioning reference signal (PRS) on RTTM resources from a network node. The RTTM signal comprises a RTTM waveform received at a RTTM waveform arrival time. The processor, the memory, and the transceiver are also configured to transmit a RTT response (RTTR) signal as an uplink (UL) PRS on RTTR resources to the network node. The RTTR signal is related to the RTTM signal and comprises an RTTR waveform and a RTTR payload. The RTTR waveform is received at a RTTR waveform arrival time. The RTTR payload comprise a UE processing time, which indicates a duration between the UE receiving the RTTM waveform and the UE transmitting the RTTR waveform. A channel state information reference signal (CSI-RS) or a synchronization signal block (SSB) may be configured for use as the RTTM waveform. Alternatively or in addition thereto, a sounding reference signal (SRS) may be configured for use as the RTTR waveform.

An exemplary method of a network node is disclosed. The method comprises transmitting a round trip time (RTT) measurement (RTTM) signal as a downlink (DL) positioning reference signal (PRS) on RTTM resources to a user equipment (UE). The RTTM signal comprises a RTTM waveform transmitted at a RTTM waveform transmit time. The method also comprises receiving a RTT response (RTTR) signal as an uplink (UL) PRS on RTTR resources from the UE. The RTTR signal is related to the RTTM signal and comprises an RTTR waveform and a RTTR payload. The RTTR waveform is received at a RTTR waveform arrival time. The RTTR payload comprise a UE processing time, which indicates a duration between the UE receiving the RTTM waveform and the UE transmitting the RTTR waveform. The method further comprises determining a RTT between the UE and the network node based on the RTTM waveform transmit time, the RTTR waveform arrival time, and the UE processing time. A channel state information reference signal (CSI-RS) or a synchronization signal block (SSB) may be configured for use as the RTTM waveform. Alternatively or in addition thereto, a sounding reference signal (SRS) may be configured for use as the RTTR waveform.

An exemplary method of a user equipment (UE) is disclosed. The method comprises receiving a round trip time (RTT) measurement (RTTM) signal as a downlink (DL) positioning reference signal (PRS) on RTTM resources from a network node. The RTTM signal comprises a RTTM waveform received at a RTTM waveform arrival time. The method also comprises transmitting a RTT response (RTTR) signal as an uplink (UL) PRS on RTTR resources to the network node. The RTTR signal is related to the RTTM signal and comprises an RTTR waveform and a RTTR payload. The RTTR waveform is transmitted at a RTTR waveform transmit time. The RTTR payload comprise a UE processing time, which indicates a duration between the UE receiving the RTTM waveform and the UE transmitting the RTTR waveform. A channel state information reference signal (CSI-RS) or a synchronization signal block (SSB) may be configured for use as the RTTM waveform. Alternatively or in addition thereto, a sounding reference signal (SRS) may be configured for use as the RTTR waveform.

Another exemplary network node is disclosed. The network node comprises means for transmitting a round trip time (RTT) measurement (RTTM) signal as a downlink (DL) positioning reference signal (PRS) on RTTM resources to a user equipment (UE). The RTTM signal comprises a RTTM waveform transmitted at a RTTM waveform transmit time. The network node also comprises means for receiving a RTT response (RTTR) signal as an uplink (UL) PRS on RTTR resources from the UE. The RTTR signal is related to the RTTM signal and comprises an RTTR waveform and a RTTR payload. The RTTR waveform is received at a RTTR waveform arrival time. The RTTR payload comprise a UE processing time, which indicates a duration between the UE receiving the RTTM waveform and the UE transmitting the RTTR waveform. The network node further comprises means for determining a RTT between the UE and the network node based on the RTTM waveform transmit time, the RTTR waveform arrival time, and the UE processing time. A channel state information reference signal (CSI-RS) or a synchronization signal block (SSB) may be configured for use as the RTTM waveform. Alternatively or in addition thereto, a sounding reference signal (SRS) may be configured for use as the RTTR waveform.

Another exemplary user equipment (UE) is disclosed. The UE comprises means for receiving a round trip time (RTT) measurement (RTTM) signal as a downlink (DL) positioning reference signal (PRS) on RTTM resources from a network node. The RTTM signal comprises a RTTM waveform received at a RTTM waveform arrival time. The UE also comprises means for transmitting a RTT response (RTTR) signal as an uplink (UL) PRS on RTTR resources to the network node. The RTTR signal is related to the RTTM signal and comprises an RTTR waveform and a RTTR payload. The RTTR waveform is transmitted at a RTTR waveform transmit time. The RTTR payload comprise a UE processing time, which indicates a duration between the UE receiving the RTTM waveform and the UE transmitting the RTTR waveform. A channel state information reference signal (CSI-RS) or a synchronization signal block (SSB) may be configured for use as the RTTM waveform. Alternatively or in addition thereto, a sounding reference signal (SRS) may be configured for use as the RTTR waveform.

An exemplary non-transitory computer-readable medium storing computer-executable instructions for a network node is disclosed. The computer-executable instructions comprise one or more instructions causing the network node to transmit a round trip time (RTT) measurement (RTTM) signal as a downlink (DL) positioning reference signal (PRS) on RTTM resources to a user equipment (UE). The RTTM signal comprises a RTTM waveform transmitted at a RTTM waveform transmit time. The computer-executable instructions also comprise one or more instructions causing the network node to receive a RTT response (RTTR) signal as an uplink (UL) PRS on RTTR resources from the UE. The RTTR signal is related to the RTTM signal and comprises an RTTR waveform and a RTTR payload. The RTTR waveform is received at a RTTR waveform arrival time. The RTTR payload comprise a UE processing time, which indicates a duration between the UE receiving the RTTM waveform and the UE transmitting the RTTR waveform. The computer-executable instructions further comprise one or more instructions causing the network node to determine a RTT between the UE and the network node based on the RTTM waveform transmit time, the RTTR waveform arrival time, and the UE processing time. A channel state information reference signal (CSI-RS) or a synchronization signal block (SSB) may be configured for use as the RTTM waveform. Alternatively or in addition thereto, a sounding reference signal (SRS) may be configured for use as the RTTR waveform.

An exemplary non-transitory computer-readable medium storing computer-executable instructions for a user equipment (UE) is disclosed. The computer-executable instructions comprise one or more instructions causing the network node to receive a round trip time (RTT) measurement (RTTM) signal as a downlink (DL) positioning reference signal (PRS) on RTTM resources from a network node. The RTTM signal comprises a RTTM waveform received at a RTTM waveform arrival time. The computer-executable instructions also comprise one or more instructions causing the network node to transmit a RTT response (RTTR) signal as an uplink (UL) PRS on RTTR resources to the network node. The RTTR signal is related to the RTTM signal and comprises an RTTR waveform and a RTTR payload. The RTTR waveform is received at a RTTR waveform arrival time. The RTTR payload comprise a UE processing time, which indicates a duration between the UE receiving the RTTM waveform and the UE transmitting the RTTR waveform. A channel state information reference signal (CSI-RS) or a synchronization signal block (SSB) may be configured for use as the RTTM waveform. Alternatively or in addition thereto, a sounding reference signal (SRS) may be configured for use as the RTTR waveform.

Another exemplary network node is disclosed. The network node comprises a transceiver, a memory, and a processor communicatively coupled with the transceiver and the memory. The processor, the memory, and the transceiver are configured to receive a round trip time (RTT) measurement (RTTM) signal as an uplink (UL) positioning reference signal (PRS) on RTTM resources from a user equipment (UE). The RTTM signal comprises a RTTM waveform received at a RTTM waveform arrival time. The processor, the memory, and the transceiver are also configured to transmit a RTT response (RTTR) signal as a downlink (DL) PRS on RTTR resources to the network node. The RTTR signal is related to the RTTM signal and comprises a RTTR waveform and a RTTR payload. The RTTR waveform is transmitted at a RTTR waveform transmit time. The RTTR payload comprises a network node processing time indicating a duration between the network node receiving the RTTM waveform and the network node transmitting the RTTR waveform. A sounding reference signal (SRS) may be configured for use as the RTTM waveform. Alternatively or in addition thereto, a channel state information reference signal (CSI-RS) or a synchronization signal block (SSB) may be configured for use as the RTTR waveform.

An exemplary user equipment (UE) is disclosed. The UE comprises a transceiver, a memory, and a processor communicatively coupled with the transceiver and the memory. The processor, the memory, and the transceiver are configured to transmit one or more round trip time (RTT) measurement (RTTM) signals as one or more uplink (UL) positioning reference signals (PRS) on RTTM resources to one or more network nodes. The one or more RTTM signal comprise one or more RTTM waveforms transmitted at one or more RTTM waveform transmit times. The processor, the memory, and the transceiver are also configured to receive one or more RTT response (RTTR) signals as one or more downlink (DL) PRSs on RTTR resources from the one or more network nodes. The one or more RTTR signals are related to the one or more RTTM signal and comprise one or more RTTR waveforms and one or more RTTR payloads. The one or more RTTR waveform are received at one or more RTTR waveform arrival times. The one or more RTTR payload comprise one or more network node processing times. Each network node processing time indicates a duration between that network node receiving the RTTM waveform and that network node transmitting the RTTR waveform. The processor, the memory, and the transceiver are further configured to determine one or more RTTs between the UE and the one or more network nodes based on the one or more RTTM waveform transmit times, the one or more RTTR waveform arrival times, and the one or more network node processing times. The processor, the memory, and the transceiver are yet further configured to determine a position of the UE based on the one or more RTTs. A sounding reference signal (SRS) may be configured for use as the RTTM waveform. Alternatively or in addition thereto, a channel state information reference signal (CSI-RS) or a synchronization signal block (SSB) may be configured for use as the RTTR waveform.

An exemplary method of a network node is disclosed. The method comprises receiving a round trip time (RTT) measurement (RTTM) signal as an uplink (UL) positioning reference signal (PRS) on RTTM resources from a user equipment (UE). The RTTM signal comprises a RTTM waveform received at a RTTM waveform arrival time. The method also comprises transmitting a RTT response (RTTR) signal as a downlink (DL) PRS on RTTR resources to the network node. The RTTR signal is related to the RTTM signal and comprises a RTTR waveform and a RTTR payload. The RTTR waveform is transmitted at a RTTR waveform transmit time. The RTTR payload comprises a network node processing time indicating a duration between the network node receiving the RTTM waveform and the network node transmitting the RTTR waveform. A sounding reference signal (SRS) may be configured for use as the RTTM waveform. Alternatively or in addition thereto, a channel state information reference signal (CSI-RS) or a synchronization signal block (SSB) may be configured for use as the RTTR waveform.

An exemplary method of a user equipment (UE) is disclosed. The method comprises transmitting one or more round trip time (RTT) measurement (RTTM) signals as one or more uplink (UL) positioning reference signals (PRS) on RTTM resources to one or more network nodes. The one or more RTTM signal comprise one or more RTTM waveforms transmitted at one or more RTTM waveform transmit times. The method also comprises receiving one or more RTT response (RTTR) signals as one or more downlink (DL) PRSs on RTTR resources from the one or more network nodes. The one or more RTTR signals are related to the one or more RTTM signal and comprise one or more RTTR waveforms and one or more RTTR payloads. The one or more RTTR waveform are received at one or more RTTR waveform arrival times. The one or more RTTR payload comprise one or more network node processing times. Each network node processing time indicates a duration between that network node receiving the RTTM waveform and that network node transmitting the RTTR waveform. The method further comprises determining one or more RTTs between the UE and the one or more network nodes based on the one or more RTTM waveform transmit times, the one or more RTTR waveform arrival times, and the one or more network node processing times. The method yet further comprises determining a position of the UE based on the one or more RTTs. A sounding reference signal (SRS) may be configured for use as the RTTM waveform. Alternatively or in addition thereto, a channel state information reference signal (CSI-RS) or a synchronization signal block (SSB) may be configured for use as the RTTR waveform.

Another exemplary network node is disclosed. The network node comprises means for receiving a round trip time (RTT) measurement (RTTM) signal as an uplink (UL) positioning reference signal (PRS) on RTTM resources from a user equipment (UE). The RTTM signal comprises a RTTM waveform received at a RTTM waveform arrival time. The network node also comprises means for transmitting a RTT response (RTTR) signal as a downlink (DL) PRS on RTTR resources to the network node. The RTTR signal is related to the RTTM signal and comprises a RTTR waveform and a RTTR payload. The RTTR waveform is transmitted at a RTTR waveform transmit time. The RTTR payload comprises a network node processing time indicating a duration between the network node receiving the RTTM waveform and the network node transmitting the RTTR waveform. A sounding reference signal (SRS) may be configured for use as the RTTM waveform. Alternatively or in addition thereto, a channel state information reference signal (CSI-RS) or a synchronization signal block (SSB) may be configured for use as the RTTR waveform.

Another exemplary user equipment (UE) is disclosed. The UE comprises means for transmitting one or more round trip time (RTT) measurement (RTTM) signals as one or more uplink (UL) positioning reference signals (PRS) on RTTM resources to one or more network nodes. The one or more RTTM signal comprise one or more RTTM waveforms transmitted at one or more RTTM waveform transmit times. The UE also comprises means for receiving one or more RTT response (RTTR) signals as one or more downlink (DL) PRSs on RTTR resources from the one or more network nodes. The one or more RTTR signals are related to the one or more RTTM signal and comprise one or more RTTR waveforms and one or more RTTR payloads. The one or more RTTR waveform are received at one or more RTTR waveform arrival times. The one or more RTTR payload comprise one or more network node processing times. Each network node processing time indicates a duration between that network node receiving the RTTM waveform and that network node transmitting the RTTR waveform. The UE further comprises means for determining one or more RTTs between the UE and the one or more network nodes based on the one or more RTTM waveform transmit times, the one or more RTTR waveform arrival times, and the one or more network node processing times. The UE yet further comprises means for determining a position of the UE based on the one or more RTTs. A sounding reference signal (SRS) may be configured for use as the RTTM waveform. Alternatively or in addition thereto, a channel state information reference signal (CSI-RS) or a synchronization signal block (SSB) may be configured for use as the RTTR waveform.

An exemplary non-transitory computer-readable medium storing computer-executable instructions for a network node is disclosed. The computer-executable instructions comprise one or more instructions causing the network node to receive a round trip time (RTT) measurement (RTTM) signal as a downlink (DL) positioning reference signal (PRS) on RTTM resources from a network node. The RTTM signal comprises a RTTM waveform received at a RTTM waveform arrival time. The computer-executable instructions also comprise one or more instructions causing the network node to transmit a RTT response (RTTR) signal as an uplink (UL) PRS on RTTR resources to the network node. The RTTR signal is related to the RTTM signal and comprises an RTTR waveform and a RTTR payload. The RTTR waveform is received at a RTTR waveform arrival time. The RTTR payload comprise a UE processing time, which indicates a duration between the UE receiving the RTTM waveform and the UE transmitting the RTTR waveform. A channel state information reference signal (CSI-RS) or a synchronization signal block (SSB) may be configured for use as the RTTM waveform. Alternatively or in addition thereto, a sounding reference signal (SRS) may be configured for use as the RTTR waveform.

An exemplary non-transitory computer-readable medium storing computer-executable instructions for a user equipment (UE) is disclosed. The computer-executable instructions comprise one or more instructions causing the UE to transmit one or more round trip time (RTT) measurement (RTTM) signals as one or more uplink (UL) positioning reference signals (PRS) on RTTM resources to one or more network nodes. The one or more RTTM signal comprise one or more RTTM waveforms transmitted at one or more RTTM waveform transmit times. The computer-executable instructions also comprise one or more instructions causing the UE to receive one or more RTT response (RTTR) signals as one or more downlink (DL) PRSs on RTTR resources from the one or more network nodes. The one or more RTTR signals are related to the one or more RTTM signal and comprise one or more RTTR waveforms and one or more RTTR payloads. The one or more RTTR waveform are received at one or more RTTR waveform arrival times. The one or more RTTR payload comprise one or more network node processing times. Each network node processing time indicates a duration between that network node receiving the RTTM waveform and that network node transmitting the RTTR waveform. The computer-executable instructions further comprise one or more instructions causing the UE to determine one or more RTTs between the UE and the one or more network nodes based on the one or more RTTM waveform transmit times, the one or more RTTR waveform arrival times, and the one or more network node processing times. The computer-executable instructions further comprise one or more instructions causing the UE to determine a position of the UE based on the one or more RTTs. A sounding reference signal (SRS) may be configured for use as the RTTM waveform. Alternatively or in addition thereto, a channel state information reference signal (CSI-RS) or a synchronization signal block (SSB) may be configured for use as the RTTR waveform.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1A:
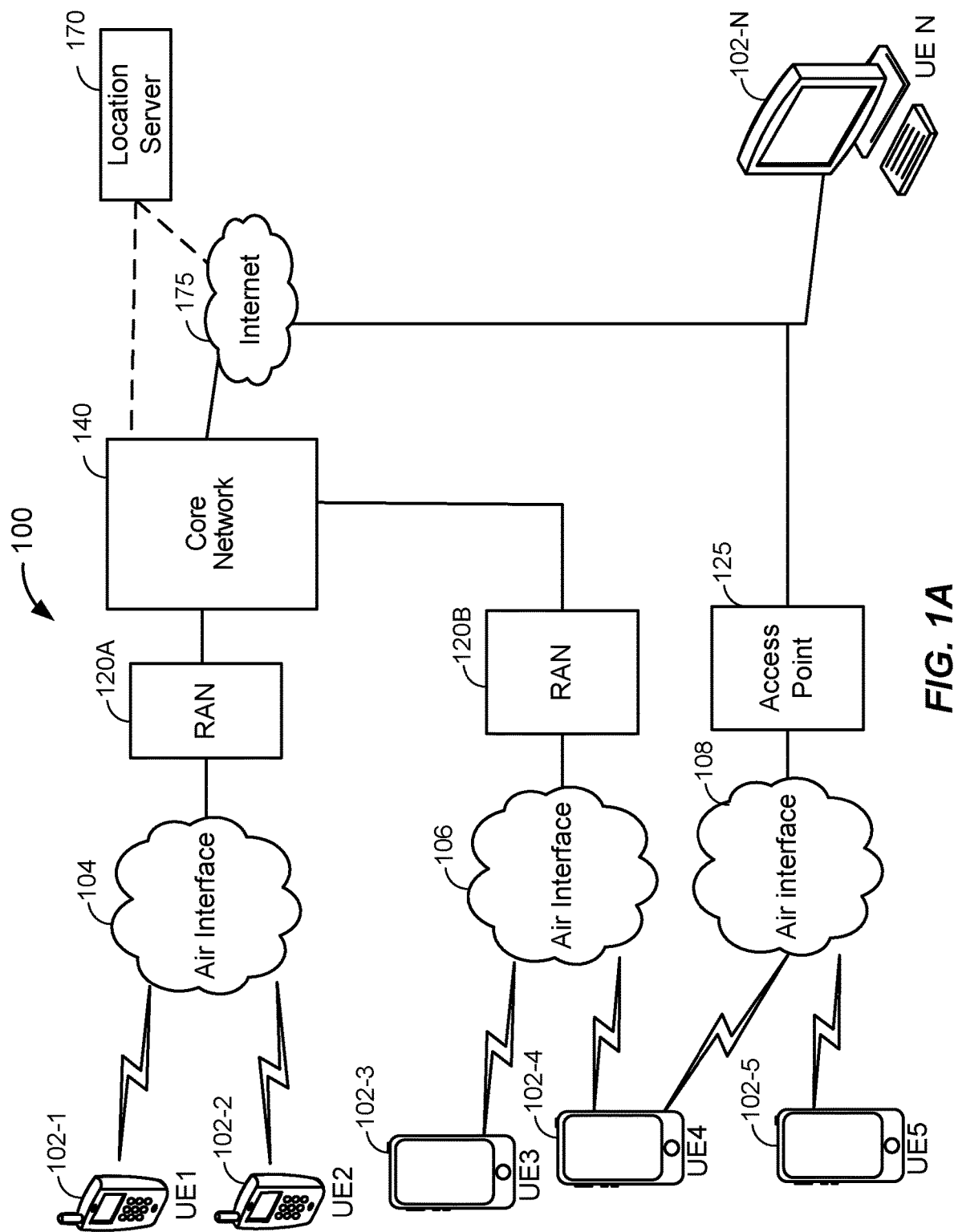
FIG. 1A illustrates a high-level system architecture of a wireless communications system in accordance with an aspect of the disclosure.

Various aspects described herein generally relate to wireless communication systems, and more particularly, and more particularly, to physical (PHY) layer aspects of round trip time (RTT) and observed time difference of arrival (OTDOA) based positioning. In an aspect, a network node may transmit and a user equipment (UE) may receive a round trip time (RTT) measurement (RTTM) signal as a downlink (DL) positioning reference signal (PRS) on RTTM resources. The RTTM resources may comprise downlink (DL) physical layer resources. The RTTM signal may comprise a RTTM waveform transmitted from the network node at a RTTM waveform transmit time and received at the UE at a RTTM waveform arrival time. The UE may transmit and the network node may receive a RTT response (RTTR) signal as an uplink (UL) PRS on RTTR resources. The RTTR resources may comprise uplink (UL) physical layer resources. The RTTR signal may be related to the RTTM signal and may comprise an RTTR waveform and a RTTR payload. The RTTR waveform may be transmitted from the UE at RTTR waveform transmit time and received at the network node at a RTTR waveform arrival time. The RTTR payload may comprise a UE processing time, which indicates a duration between the UE receiving the RTTM waveform and the UE transmitting the RTTR waveform. The network node may determine the RTT between the UE and the network node based on the RTTM waveform transmit time, the RTTR waveform arrival time, and the UE processing time.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (UE) and "base station" are not intended to be specific or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

Elements, stages, steps, and/or actions with the same reference label in different drawings may correspond to one another (e.g., may be similar or identical to one another). Further, some elements in the various drawings are labelled using a numeric prefix followed by an alphabetic or numeric suffix. Elements with the same numeric prefix but different suffixes may be different instances of the same type of element. The numeric prefix without any suffix is used herein to reference any element with this numeric prefix. For example, different instances 102-1, 102-2, 102-3, 102-4, 102-5, and 102-N of a UE are shown in FIG. 1A. A reference to a UE 102 then refers to any of UEs 102-1, 102-2, 102-3, 102-4, 102-5, and 102-N.

FIG. 1A illustrates a high-level system architecture of a wireless communications system 100 in accordance with an aspect of the disclosure. The wireless communications system 100 may include UEs 1 to N (referenced as 102-1 to 102-N). The UEs 102-1 to 102-N can be cellular telephones, personal digital assistant (PDAs), pagers, a laptop computer, a tablet computer, a desktop computer, and so on. For example, in FIG. 1A, UE 102-1 and UE 102-2 are illustrated as cellular feature phones, UEs 102-3, 102-4, and 102-5 are illustrated as cellular touchscreen phones, or "smartphones," and UE 102-N is illustrated as a desktop computer, or personal computer (often referred to as a "PC"). Although only six UEs 102 are shown in FIG. 1A, the number of UEs 102 in wireless communications system 100 may be in the hundreds, thousands, or millions (e.g., N may be any number up to or greater than one million).

Referring to FIG. 1A, UEs 102-1 to 102-N may be configured to communicate with one or more access networks (e.g., the RANs 120A and 120B, the access point 125, etc.) over a physical communications interface or layer, shown in FIG. 1A as air interfaces 104, 106, and 108 and/or a direct wired connection. The air interfaces 104 and 106 can comply with a given cellular communications protocol (e.g., Code Division Multiple Access (CDMA), Evolution-Data Optimized (E-VDO), Enhanced High Rate Packet Data (eHRPD), Global System for Mobile communications (GSM), Wideband CDMA (W-CDMA), LTE, LTE-U, 5G NR, etc.), while the air interface 108 can comply with a Wireless Local Area Network (WLAN) protocol (e.g., IEEE 802.11). Both RAN 120A and 120B may include a plurality of access points that serve UEs over air interfaces, such as the air interfaces 104 and 106. The access points in the RAN 120A and 120B can be referred to as access nodes (ANs), access points (APs), base stations (BSs), Node Bs, eNodeBs, gNodeBs, and so on. For example, an eNodeB (also referred to as an evolved NodeB) is typically a base station that supports wireless access by UEs 102 according to the LTE wireless interface defined by 3GPP. As another example, a gNodeB, or gNB, is typically a base station that supports wireless access by UEs 102 according to the 5G NR wireless interface. These access points can be terrestrial access points (or ground stations), or satellite access points.

Both RANs 120A and 120B may be configured to connect to a core network 140 that can perform a variety of functions, including routing and connecting circuit switched (CS) calls between UEs 102 served by the RAN 120A/120B and other UEs 102 served by the RAN 120A/120B or UEs served by a different RAN altogether, and can also mediate an exchange of packet-switched (PS) data with external networks such as Internet 175 and external clients and servers.

The Internet 175 may include a number of routing agents and processing agents (not shown in FIG. 1A for the sake of convenience). In FIG. 1A, UE 102-N is shown as connecting to the Internet 175 directly (i.e., separate from the core network 140, such as over an Ethernet connection of WiFi or 802.11-based network). The Internet 175 can thereby function to route and connect packet-switched data communications between UE 102-N and UEs 102-1 to 102-5 via the core network 140.

The access point 125 may be separate from the RANs 120A and 120B. The access point 125 may be connected to the Internet 175 independently of the core network 140 (e.g., via an optical communication system such as FiOS, a cable modem, etc.). The air interface 108 may serve UE 102-4 or UE 102-5 over a local wireless connection, such as IEEE 802.11 in an example. UE 102-N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1A, a location server 170 is shown as connected to the Internet 175 and the core network 140. The location server 170 can be implemented as a plurality of structurally separate servers, or alternately may each correspond to a single server. As will be described below in more detail, the location server 170 may be configured to support one or more location services for UEs 102 that can connect to the location server 170 via the core network 140 and/or via the Internet 175.

An example of a protocol-specific implementation for the RANs 120A and 120B and the core network 140 is provided below with respect to FIG. 1B to help explain the wireless communications system 100 in more detail. In particular, the components of the RANs 120A and 120B and the core network 140 may correspond to components associated with supporting packet-switched (PS) communications, whereby legacy circuit-switched (CS) components may also be present in these networks, but any legacy CS-specific components are not shown explicitly in FIG. 1B.

Figure 1B:
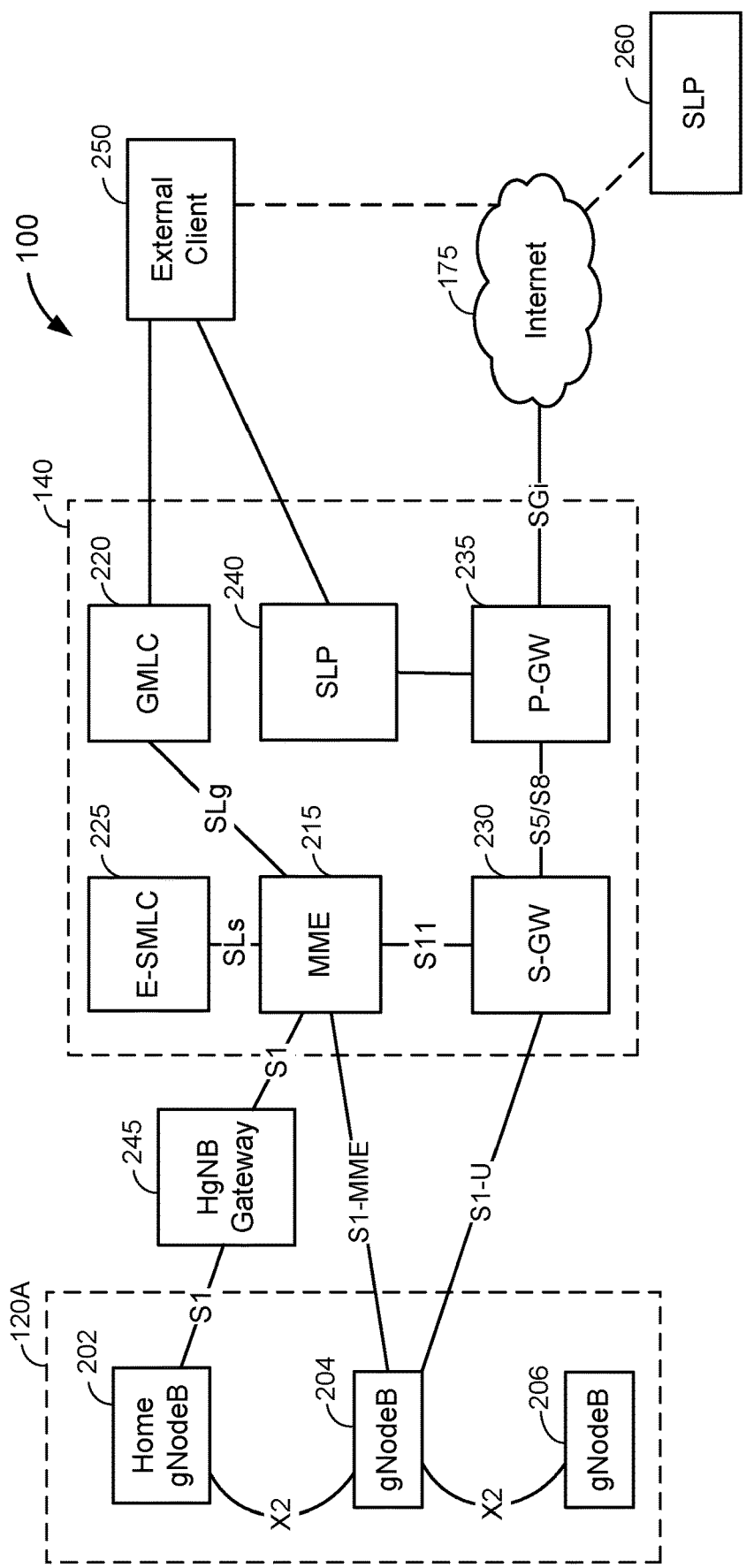
FIG. 1B illustrates an example configuration of radio access networks (RANs) and a packet-switched portion of a core network that is based on an LTE network in accordance with an aspect of the disclosure.

FIG. 1B illustrates an example configuration of a portion of the RAN 120A and a portion of the core network 140 based on a 5G NR network, in accordance with an aspect of the disclosure. Referring to FIG. 1B, RAN 120A may be configured with a plurality of gNodeBs 202, 204, and 206. In the example of FIG. 1B, gNodeB 202 is shown as a Home gNodeB (HgNodeB) and interfaces with the RAN 120A via a HgNodeB gateway 245. The Home gNodeB 202 may be an example of a "small cell base station." The term "small cell" generally refers to a class of low-powered base stations that may include or be otherwise referred to as femto cells, pico cells, micro cells, home base stations, Wi-Fi APs, other small coverage area APs, etc. A small cell may be deployed to supplement macro cell (e.g., gNodeB) coverage and/or increase network capacity. A small cell may provide wireless coverage indoors such as within a house, office, a portion of a large building, a portion of a convention center, shopping mall, etc. A small cell may instead or in addition provide wireless coverage outdoors such as over an area covering part of a block or a few blocks within a neighborhood. Small cells may communicate using unlicensed frequency bands, as opposed to macro cells, which may typically communicate using licensed frequency bands.

In FIG. 1B, the core network 140 may include an Evolved Serving Mobile Location Center (E-SMLC) 225, a Mobility Management Entity (MME) 215, a Gateway Mobile Location Center (GMLC) 220, a Serving Gateway (S-GW) 230, a Packet Data Network Gateway (P-GW) 235, and a Secure User Plane Location (SUPL) Location Platform (SLP) 240. In the example of FIG. 1B, the location server 170 in FIG. 1A may correspond to one or more of the E-SMLC 225, the GMLC 220, or the SLP 240.

Network interfaces between the components of the core network 140, the RAN 120A, and the Internet 175 are illustrated in FIG. 1B and are defined as follows:

S1-MME—Reference point for the control plane protocol between RAN 120A and MME 215.

S1-U—Reference point between RAN 120A and S-GW 230 for the per bearer user plane tunneling and inter-gNodeB path switching during handover.

S5—Provides user plane tunneling and tunnel management between S-GW 230 and P-GW 235. It is used for S-GW relocation due to UE mobility and if the S-GW 230 needs to connect to a non-collocated P-GW for the required PDN connectivity.

S8—Inter-PLMN reference point providing user and control plane between the S-GW 230 in a Visited Public Land Mobile Network (VPLMN) and the P-GW 235 in a Home Public Land Mobile Network (HPLMN). S8 is the inter-PLMN variant of S5. P-GW 235 is shown as being in the same Public Land Mobile Network (PLMN) as S-GW 230 in FIG. 1B so only the S5 interface may apply in FIG. 1B. But the S8 interface would apply if P-GW 235 was located in a different PLMN.

S11—Reference point between MME 215 and S-GW 230.

SGi—Reference point between the P-GW 235 and a packet data network (PDN), shown in FIG. 1B as the Internet 175. The PDN may be an operator external public or private packet data network or an intra-operator packet data network (e.g., for provision of IMS services). This reference point corresponds to Gi for 3GPP accesses.

X2—Reference point between two different gNodeBs used for UE handoffs.

A high-level description of some of the components shown in the RANs 120A and 120B and the core network 140 of FIG. 1B is now provided. However, these components are each well-known from various 3GPP and Open Mobile Alliance (OMA) Technical Specifications (TSs), and the description contained herein is not intended to be an exhaustive description of all functionalities performed by these components.

Referring to FIG. 1B, the MME 215 may be configured to manage the control plane signaling for the Evolved Packet System (EPS). MME functions may include: Non-Access Stratum (NAS) signaling, NAS signaling security, Mobility management for UEs 102 including support for inter-RAN and intra-RAN handovers, P-GW and S-GW selection, and MME selection for handovers with a change of MME.

The S-GW 230 is the gateway that terminates the interface toward the RAN 120A. For each UE 102 attached to the core network 140 for a 5G-based system, at a given point of time, there can be a single S-GW 230. The functions of the S-GW 230 may include: serving as a mobility anchor point, packet routing and forwarding, and setting the Differentiated Services Code Point (DSCP) based on a Quality of Service (QoS) Class Identifier (QCI) of an associated EPS bearer.

The P-GW 235 is the gateway that terminates the SGi interface toward the Packet Data Network (PDN), e.g., the Internet 175. If a UE 102 is accessing multiple PDNs, there may be more than one P-GW 235 for that UE 102. P-GW 235 functions may include: providing PDN connectivity to UEs 102, UE IP address allocation, setting the DSCP based on the QCI of the associated EPS bearer, accounting for inter operator charging, uplink (UL) and downlink (DL) bearer binding, and UL bearer binding verification.

As further illustrated in FIG. 1B, an external client 250 may be connected to the core network 140 via the GMLC 220 and/or the SLP 240. The external client 250 may optionally be connected to the core network 140 and/or the SLP 260 via the Internet 175. The external client 250 may be a server, a web server, or a user device, such as a personal computer, a UE, etc.

The HgNodeB Gateway 245 in FIG. 1B may be used to support connection of small cells and/or HgNodeBs, such as HgNodeB 202. HgNodeB Gateway 245 may include or be connected to a Security Gateway (not shown in FIG. 1B). The Security Gateway may help authenticate the small cells and/or HgNodeBs, such as HgNodeB 202, and/or may enable secure communication between the small cells and/or HgNodeBs, such as HgNodeB 202, and other network entities, such as MME 215. The HgNodeB Gateway 245 may perform protocol relaying and conversion in order to allow small cells and/or HgNodeBs, such as HgNodeB 202, to communicate with other entities, such as MME 215.

The GMLC 220 may be a location server that enables an external client, such as an external client 250, to request and obtain a location estimate for a UE 102. Functions of the GMLC 220 may include authenticating and authorizing the external client 250 and requesting and obtaining a location estimate for a UE 102 from the MME 215 on behalf of the external client 250.

The E-SMLC 225 may process positioning requests, e.g., from the MME 215. The E-SMLC 225 may communicate with the UE 102 to request reference signal timing difference (RSTD) measurements. From the received RSTD measurements, the E-SMLC 225 may estimate the position of the UE 102 and send the results to the MME 215, which can forward the results to the external client 250.

The SLP 240 and SLP 260 may support the Secure User Plane Location (SUPL) location solution defined by the OMA, which is a user plane (UP) location solution. With a UP location solution, signaling to initiate and perform positioning of a UE 102 may be transferred using interfaces and protocols that support transfer of data (and possibly voice and other media). With the SUPL UP location solution, the location server may include or take the form of a SUPL Location Platform (SLP), such as SLP 240 or SLP 260. In FIG. 1B, either or both of SLPs 240 and 260 may be a Home SLP (H-SLP) for one or more of UEs 102, an emergency SLP (E-SLP), and/or a Discovered SLP (D-SLP). The functions of the SLPs 240 and 260 may include some or all of the functions described previously for both the E-SMLC 225 and the GMLC 220.

Figure 2:
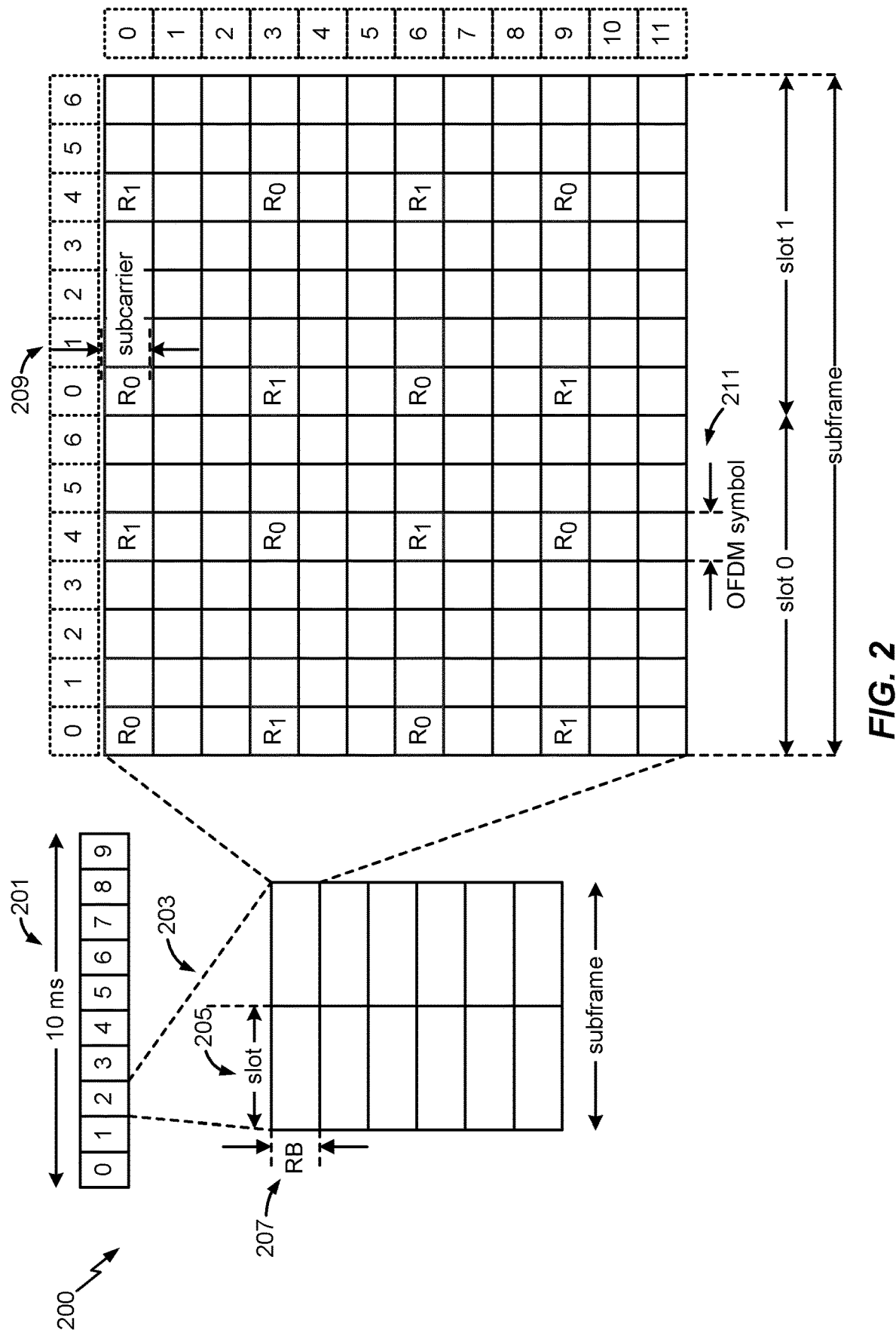
FIG. 2 is a diagram illustrating an example of a frame structure for use in a wireless telecommunications system according to an aspect of the disclosure.

Time intervals of a communications resource in LTE or 5G NR may be organized according to radio frames. FIG. 2 illustrates an example of a downlink radio frame structure 200 according to an aspect of the disclosure. However, the frame structure for any particular application may be different depending on any number of factors. In this example, a frame 201 (10 ms) is divided into 10 equally sized sub-frames 203 (1 ms). Each sub-frame 203 includes two consecutive time slots 205 (0.5 ms).

A resource grid may be used to represent two time slots 205, each time slot 205 including a resource block 207. The resource grid may be divided into multiple resource elements. In LTE, and in some cases 5G NR, a resource block contains 12 consecutive subcarriers 209 in the frequency domain and, for a normal cyclic prefix in each OFDM symbol 211, 7 consecutive OFDM symbols 211 in the time domain, or 84 resource elements. Some of the resource elements, as indicated as $R_0$ and $R_1$, include a downlink reference signal (DL-RS). The DL-RS includes Cell-specific RS (CRS) (also sometimes called common RS) and UE-specific RS (UE-RS). UE-RS are transmitted only on the resource blocks upon which the corresponding physical downlink shared channel (PDSCH) is mapped. The number of bits carried by each resource element can depend on the modulation scheme. Thus, the more resource blocks 207 that a UE receives and the higher the modulation scheme, the higher the data rate for the UE.

LTE, and in some cases 5G NR, utilizes OFDM on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

Figure 3:
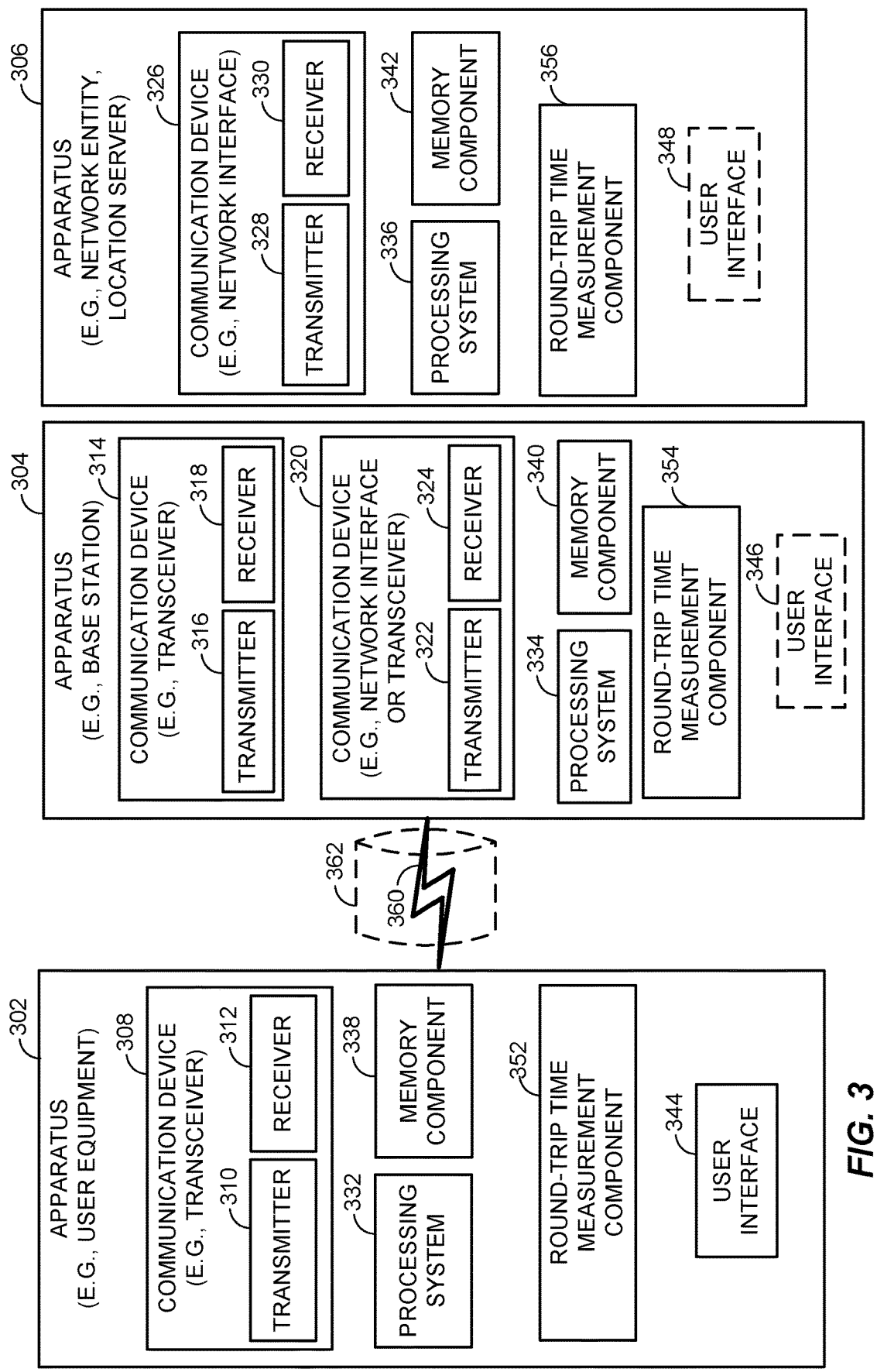
FIG. 3 is a simplified block diagram of several sample aspects of components that may be employed in wireless communication nodes and configured to support communication according to an aspect of the disclosure.

FIG. 3 illustrates several sample components (represented by corresponding blocks) that may be incorporated into an apparatus 302, an apparatus 304, and an apparatus 306 (corresponding to, for example, a UE, a base station (e.g., a gNodeB), and a network entity, respectively) to support the operations as disclosed herein. As an example, the apparatus 302 may correspond to a UE 102, the apparatus 304 may correspond to any of gNodeBs 202-206, and the apparatus 306 may correspond to the E-SMLC 225, SLP 240, SLP 260, GMLC 220, location server, location management function (LMF), etc. It will be appreciated that the components may be implemented in different types of apparatuses in different implementations (e.g., in an ASIC, in a System-on-Chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 302 and the apparatus 304 may each include at least one wireless communication device (represented by the communication devices 308 and 314) for communicating with other nodes via at least one designated RAT (e.g., LTE, 5G NR). Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Each communication device 314 may include at least one transmitter (represented by the transmitter 316) for transmitting signals (e.g., messages, indications, information, pilots, and so on) and at least one receiver (represented by the receiver 318) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include a plurality of antennas, such as an antenna array, that permits the respective apparatus to perform transmit "beamforming," as described further herein. Similarly, a receiver may include a plurality of antennas, such as an antenna array, that permits the respective apparatus to perform receive beamforming, as described further herein. In an aspect, the transmitter and receiver may share the same plurality of antennas, such that the respective apparatus can only receive or transmit at a given time, not both at the same time. A wireless communication device (e.g., one of multiple wireless communication devices) of the apparatus 304 may also comprise a Network Listen Module (NLM) or the like for performing various measurements.

The apparatus 304 and the apparatus 306 may include at least one communication device (represented by the communication device 320 and the communication device 326) for communicating with other nodes. For example, the communication device 326 may comprise a network interface (e.g., one or more network access ports) that is configured to communicate with one or more network entities via a wire-based or wireless backhaul connection. In some aspects, the communication device 326 may be implemented as a transceiver configured to support wire-based or wireless signal communication. This communication may involve, for example, sending and receiving: messages, parameters, or other types of information. Accordingly, in the example of FIG. 3, the communication device 326 is shown as comprising a transmitter 328 and a receiver 330 (e.g., network access ports for transmitting and receiving). Similarly, the communication device 320 may comprise a network interface configured to communicate with one or more network entities via a wire-based or wireless backhaul. As with the communication device 326, the communication device 320 is shown as comprising a transmitter 322 and a receiver 324.

The apparatuses 302, 304, and 306 may also include other components that may be used in conjunction with the operations as disclosed herein. The apparatus 302 may include a processing system 332 for providing functionality relating to, for example, RTT measurements in a licensed or unlicensed frequency band as disclosed herein and for providing other processing functionality. The apparatus 304 may include a processing system 334 for providing functionality relating to, for example, RTT measurements in a licensed or unlicensed frequency band as disclosed herein and for providing other processing functionality. The apparatus 306 may include a processing system 336 for providing functionality relating to, for example, RTT measurements in a licensed or unlicensed frequency band as disclosed herein and for providing other processing functionality. In an aspect, the processing systems 332, 334, and 336 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 may include memory components 338, 340, and 342 (e.g., each including a memory device), respectively, for maintaining information (e.g., information indicative of reserved resources, thresholds, parameters, and so on). In addition, the apparatuses 302, 304, and 306 may include user interface devices 344, 346, and 348, respectively, for providing indications (e.g., audible and/or visual indications) to a user and/or for receiving user input (e.g., upon user actuation of a sensing device such a keypad, a touch screen, a microphone, and so on).

For convenience, the apparatuses 302, 304, and/or 306 are shown in FIG. 3 as including various components that may be configured according to the various examples described herein. It will be appreciated, however, that the illustrated blocks may have different functionality in different designs.

The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, and 344 may be implemented by processor and memory component(s) of the apparatus 302 (e.g., by execution of appropriate code and/or by appropriate configuration of processor components). Similarly, some or all of the functionality represented by blocks 314, 320, 334, 340, and 346 may be implemented by processor and memory component(s) of the apparatus 304 (e.g., by execution of appropriate code and/or by appropriate configuration of processor components). Also, some or all of the functionality represented by blocks 326, 336, 342, and 348 may be implemented by processor and memory component(s) of the apparatus 306 (e.g., by execution of appropriate code and/or by appropriate configuration of processor components).

In an aspect, the apparatus 304 may correspond to a "small cell" or a Home gNodeB, such as Home gNodeB 202 in FIG. 1B. The apparatus 302 may transmit and receive messages via a wireless link 360 with the apparatus 304, the messages including information related to various types of communication (e.g., voice, data, multimedia services, associated control signaling, etc.). The wireless link 360 may operate over a communication medium of interest, shown by way of example in FIG. 3 as the medium 362, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 304 and the apparatus 302 for the medium 362.

As a particular example, the medium 362 may correspond to at least a portion of an unlicensed frequency band shared with another RAN and/or other APs and UEs. In general, the apparatus 302 and the apparatus 304 may operate via the wireless link 360 according to one or more radio access types, such as LTE, LTE-U, or 5G NR, depending on the network in which they are deployed. These networks may include, for example, different variants of CDMA networks (e.g., LTE networks, 5G NR networks, etc.), TDMA networks, FDMA networks, Orthogonal FDMA (OFDMA) networks, Single-Carrier FDMA (SC-FDMA) networks, and so on. Although different licensed frequency bands have been reserved for wireless communications (e.g., by a government entity such as the Federal Communications Commission (FCC) in the United States), certain communication networks, in particular those employing small cell base stations, have extended operation into unlicensed frequency bands, such as the Unlicensed National Information Infrastructure (U-NII) band used by WLAN technologies, most notably IEEE 802.11x WLAN technologies generally referred to as "Wi-Fi," and LTE in unlicensed spectrum technologies generally referred to as "LTE-U" or "MuLTE-Fire."

Apparatus 302 may also include an RTT measurement component 352 that may be used to obtain location related measurements of signals (e.g., RTT or other signals) transmitted by a base station or AP (e.g., any of gNodeBs 202-206) according to techniques described herein. Location related measurements may include measurements of signal propagation time or RTT between a UE 102 and a base station or AP, such as any of gNodeBs 202-206.

Apparatus 304 and 306 may each include RTT measurement component 354 and 356, respectively, which may be used to determine a location estimate for a UE 102 (e.g., apparatus 302), according to techniques described herein, based on location related measurements provided by the UE 102 and/or by a base station or AP, such as any of gNodeBs 202-206. Location related measurements obtained by the UE 102 may include measurements of signal propagation time or RTT between a UE 102 and a base station or AP, such as any of gNodeBs 202-206. Location related measurements obtained by any of gNodeBs 202-206 (e.g., apparatus 304) may include measurements of signal propagation time or RTT between the UE 102 and a base station or AP, such as any of gNodeBs 202-206.

Figure 4:
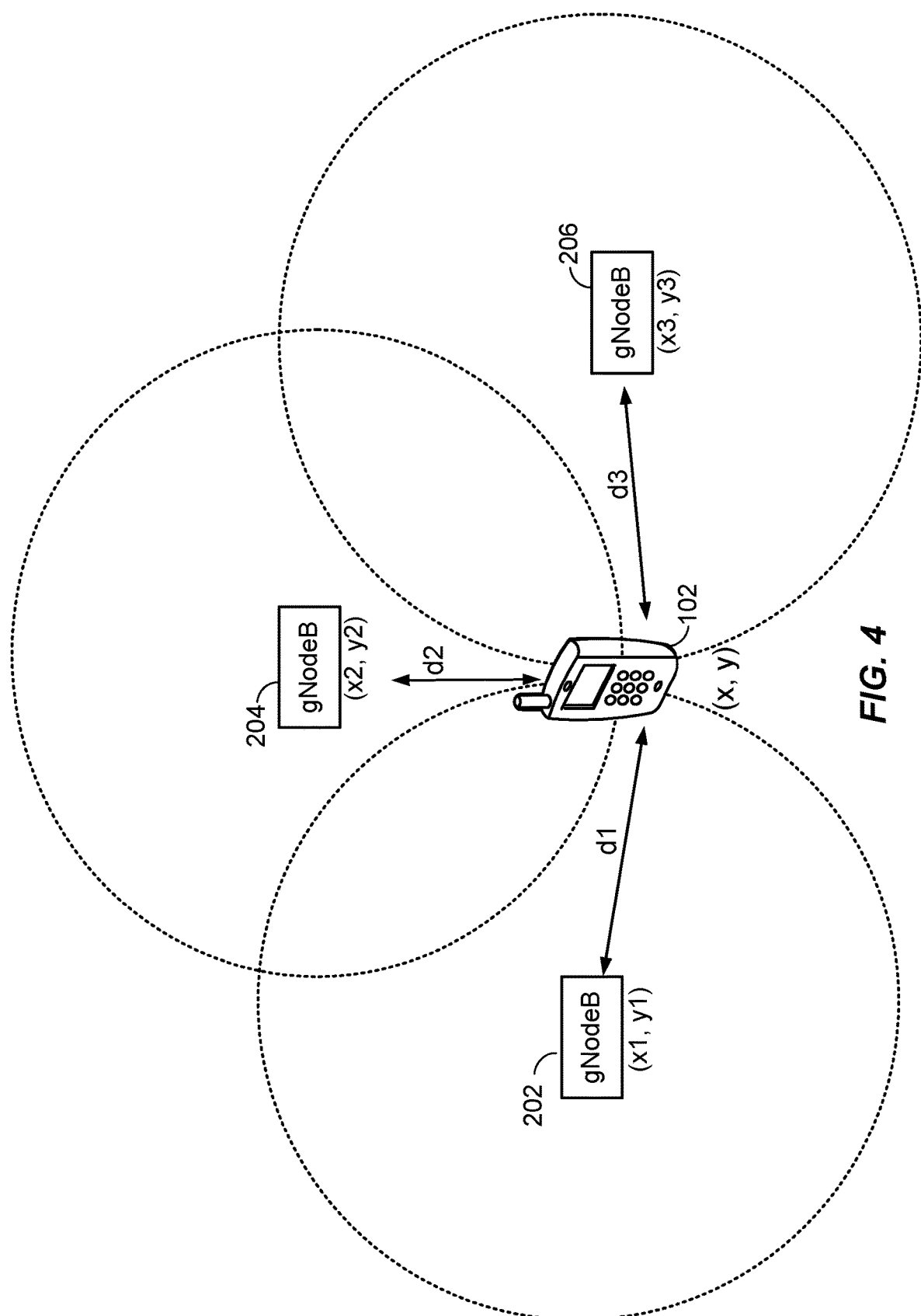
FIG. 4 is a diagram illustrating an exemplary technique for determining a position of a mobile station using information obtained from a plurality of base stations according to an aspect of the disclosure.

A simplified environment is shown in FIG. 4 for illustrating an exemplary technique for determining a position of a UE 102. The UE 102 may communicate wirelessly with a plurality of gNodeBs 202-206 using radio frequency (RF) signals and standardized protocols for the modulation of the RF signals and the exchanging of information packets. By extracting different types of information from the exchanged signals, and utilizing the layout of the network (i.e., the network geometry) the UE 102 or any of the gNodeBs 202-206 may determine the UE 102's position in a predefined reference coordinate system. As shown in FIG. 4, the position (x, y) of the UE 102 may be specified using a two-dimensional coordinate system; however, the aspects disclosed herein are not so limited, and may also be applicable to determining positions using a three-dimensional coordinate system, if the extra dimension is desired. Additionally, while three gNodeBs 202-206 are shown in FIG. 4, aspects may utilize additional gNodeBs.

If the UE 102 is to determine its position (x, y), the UE 102 may first to determine the network geometry. The network geometry can include the positions of each of the gNodeBs 202-206 in a reference coordinate system ($(x_k, y_k)$, where k=1, 2, 3). The network geometry may be provided to the UE 102 in any manner, such as, for example, providing this information in beacon signals, providing the information using a dedicated server external on an external network, providing the information using uniform resource identifiers, providing the information through base station almanac (BSA), etc.

In determining the position of the UE 102, whether by the UE 102 (UE-based) or by the network (UE-assisted), a distance ($d_k$, where k=1, 2, 3) of the UE 102 to each of the gNodeBs 202-206 may be determined. As will be described in more detail below, there are a number of different approaches for estimating these distances ($d_k$) by exploiting different characteristics of the RF signals exchanged between the UE 102 and gNodeBs 202-206. Such characteristics may include, as will be discussed below, the round trip propagation time of the signals, and/or the strength of the signals (RSSI).

In other aspects, the distances ($d_k$) may in part be determined or refined using other sources of information that are not associated with the gNodeBs 202-206. For example, other positioning systems, such as GPS, may be used to provide a rough estimate of $d_k$. (Note that it is likely that GPS may have insufficient signal in the anticipated operating environments (indoors, metropolitan, etc.) to provide a consistently accurate estimate of $d_k$. However GPS signals may be combined with other information to assist in the position determination process.) Other relative positioning devices may reside in the UE 102 which can be used as a basis to provide rough estimates of relative position and/or direction (e.g., on-board accelerometers).

Once each distance $d_k$ is determined, the UE 102's position (x, y) may be solved by using a variety of known geometric techniques, such as, for example, trilateration. From FIG. 4, it can be seen that the position of the UE 102 ideally lies at the intersection of the circles drawn using dotted lines. Each circle being defined by radius $d_k$ and center ($x_k$, $y_k$), where k=1, 2, 3. In practice, the intersection of these circles may not lie at a single point due to the noise and other errors in the networking system.

Determining the distance between the UE 102 and each gNodeB 202-206 may involve exploiting time information of the RF signals. In an aspect, determining the RTT of signals exchanged between the UE 102 and a gNodeB 202-206 can be performed and converted to a distance ($d_k$). RTT techniques can measure the time between sending a data packet and receiving a response. These methods utilize calibration to remove any processing delays. In some environments, it may be assumed that the processing delays for the UE 102 and the gNodeBs 202-206 are the same. However, such an assumption may not be true in practice.

A position estimate (e.g., for a UE 102) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5:
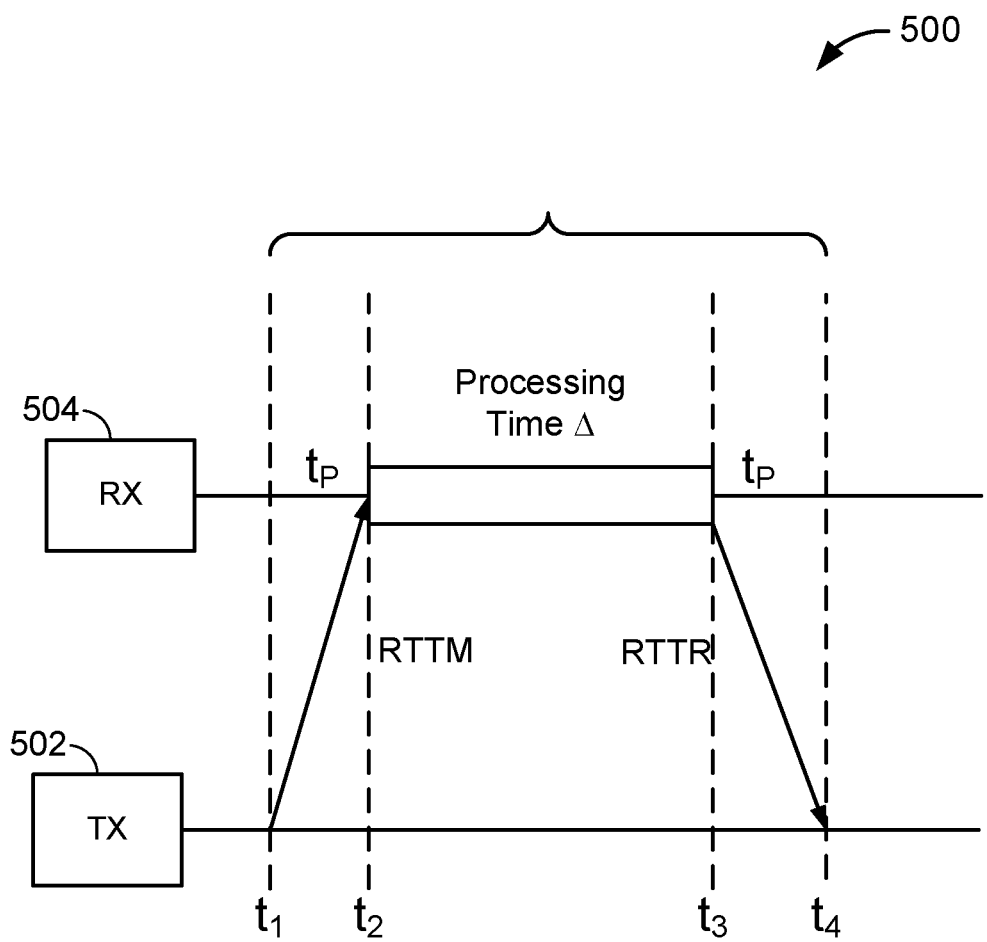
FIG. 5 is a diagram showing exemplary timings within an RTT occurring during a wireless probe request and a response according to an aspect of the disclosure.

FIG. 5 is a diagram 500 showing exemplary timings within an RTT occurring during a wireless probe request and a response between a transmitter 502 and a receiver 504. For a network centric (UE-assisted) RTT determination, the transmitter 502 may correspond to a network node (e.g., any of the gNodeBs 202-206) and the receiver 504 may correspond to the UE 102. For a UE centric (UE-based) RTT determination, the transmitter 502 may correspond to the UE 102 and the receiver 504 may correspond to the network node. In an aspect, the response may take the form of an acknowledgement packet (ACK); however, any type of response packet would be consistent with various aspects of the disclosure. For example, a Request to Send (RTS) transmit packet and/or Clear to Send (CTS) response packet may be suitable.

To measure the RTT between the transmitter 502 and the receiver 504, the transmitter 502 can send an RTT Measurement (RTTM) signal at time $t_1$. After a propagation time $t_P$, the receiver 504 may receive the RTTM signal at time $t_2$. The RTTM signal may include a waveform, and may also include a payload. The RTTM waveform allows the receiver 504 to measure the time $t_2$. Hence, the times $t_1$ and $t_2$ may respectively be referred to as RTTM waveform transmit time and RTTM waveform arrival time.

Subsequently, the receiver 504 may then process the received RTTM signal. After some processing and turn-around time $\Delta$, the receiver 504 may send an RTT Response (RTTR) signal at time $t_3$. After the propagation time $t_P$, the RTTR signal reaches the transmitter 502 at time $t_4$. The RTTR signal may include a waveform and a payload. The RTTR waveform allows the transmitter 502 to measure the time $t_4$. Hence, the times $t_3$ and $t_4$ may respectively be referred to as RTTR waveform transmit time and RTTR waveform arrival time.

In an aspect, the flight time or RTT may be calculated as the total time minus the processing time at the receiver 504, i.e., RTT=$(t_4-t_1)-(t_3-t_2)$. Each of the bracketed term includes terms that are measured by the same entity—i.e., $t_4$ and $t_1$ are measured by the transmitter 502, and $t_3$ and $t_2$ are measured by the receiver 504. This means that timing synchronization between transmitter and receiver is not required.

Accuracy of the position location methods may be affected by the characteristics of the RTTM and RTTR signals. For example, in some instances, it may be sufficient to have a coarse (e.g., within a cyclic prefix (CP) duration of Orthogonal Frequency-Division Multiplexing (OFDM) symbols) level time synchronization across gNodeBs. Coarse time-synchronization enables low-reuse of RTTMs, which mitigates intercell interference. Intercell interference mitigation ensures deep penetration of the RTTM signals, which enables multiple independent timing measurements across distinct gNodeBs, and hence more accurate positioning.

In a network-centric RTT estimation, the serving gNodeB (e.g., one of gNodeBs 202-206) may instruct the UE (e.g., UE 102) to scan for/receive RTTM signals from one or more neighboring gNodeBs (one of more of gNodeBs 202-206). The one of more gNodeBs may transmit the RTTM signals on low reuse resources, allocated by the network (e.g., location server 170). The UE may record the arrival times $t_{2,i}$ of each RTTM(i) waveform, and transmit a common or individual RTTR signal(s) to the one or more gNodeBs (when instructed by its serving gNodeB).

An individual RTTR(i) signal directed at a particular gNodeB(i) may include, in its payload, the UE processing time $(t_3-t_2)$. When multiple gNodeBs are involved, the payload may also report on detected changes in DL timing from different gNodeBs. This can help the gNodeBs to better synchronize their clocks. This also can help in tracking the UE's movement, e.g., in positioning or in navigation.

The network may allocate low reuse resources for the UE to transmit the RTTR signals. Each gNodeB(i) that receives the RTTR signal may record its RTTR waveform arrival time $t_3$. The gNodeB(i) can compute the RTT between the UE and itself as $(t_4-t_1)-(t_3-t_2)$. This computation may be performed either at the gNodeBs receiving the RTTR signal from the UE, or at a central location in the network (e.g., location server, location management function (LMF), and/or the serving gNodeB). The central location may have access to other information that helps improve the positioning accuracy, such as base station almanac (BSA), and other reports from UE and/or gNB (such as RSRP, AoA, AoD estimates, etc.). The RTTR payload carrying the value of $(t_3-t_2)$ could be addressed directly to the gNB or to the central location server via NAS containers within RRC messaging which may or may not be readable by the gNB.

Figure 6:
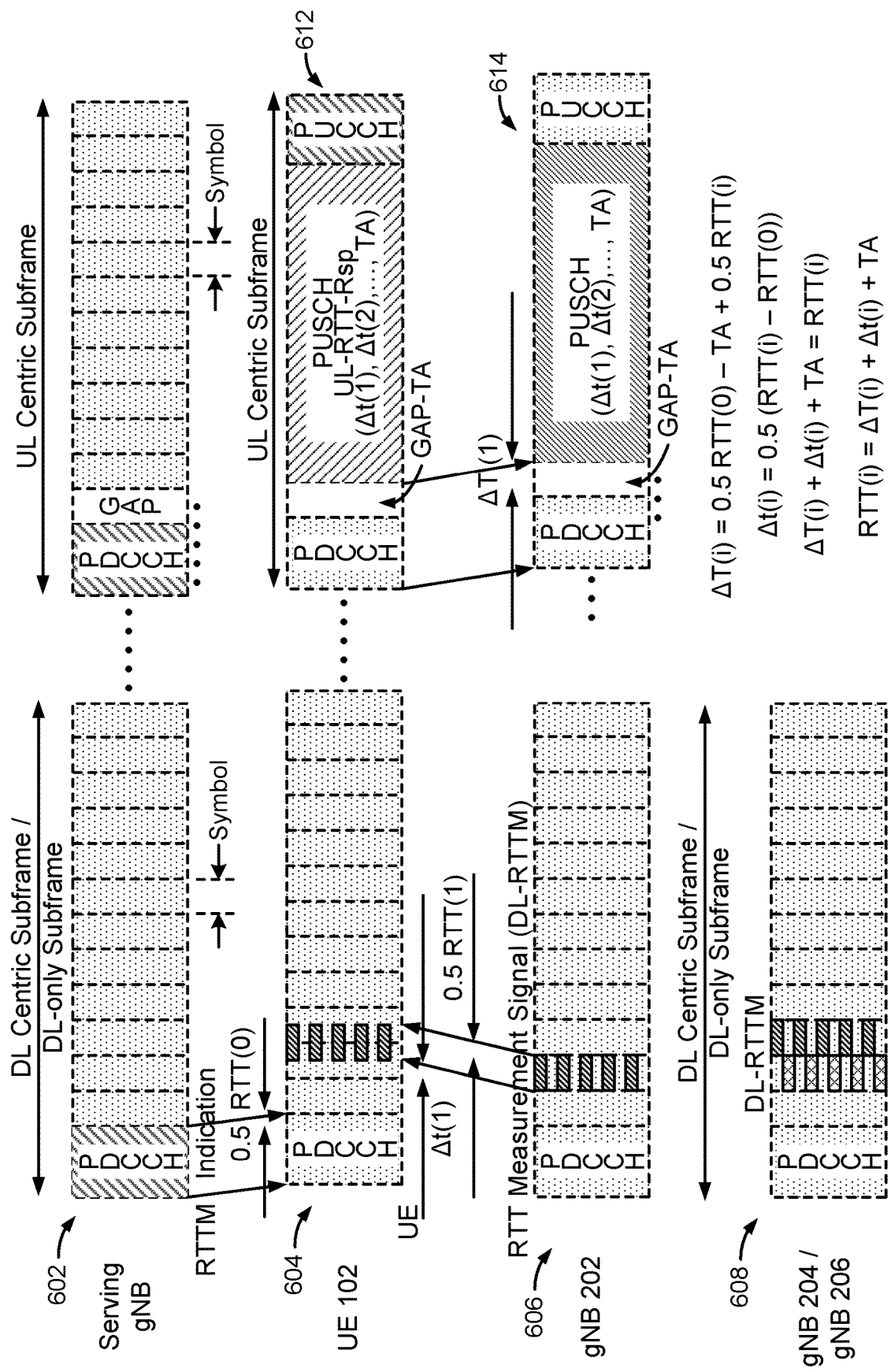
FIG. 6 illustrates an example of the network-centric RTT estimation according to an aspect of the disclosure.

FIG. 6 illustrates an example of the network-centric RTT estimation technique according to an aspect of the disclosure. As shown in FIG. 6, on a downlink-centric/downlink-only subframe (at low duty-cycle) 602, the serving gNodeB may send a control signal (e.g., on the Physical Downlink Control Channel (PDCCH)) to the UE 102 during the first two symbol periods of the downlink subframe 602, indicating to the UE 102 that one or more gNodeBs (gNodeBs 202-206 in the example of FIG. 6) will be transmitting downlink RTT Measurement (RTTM) signal(s).

During the downlink subframes 606 and 608, gNodeBs 202-206 may transmit RTTM signals at specified (by the network, e.g., location server 170, or the serving gNodeB) symbols of the downlink subframes 606 and 608, in a time division multiplexing (TDM) or frequency division multiplexing (FDM) fashion (as illustrated by the horizontal subdivisions of the respective symbols of the downlink subframes 606 and 608). Although not illustrated, the serving gNodeB may also transmit an RTTM signal during the downlink subframe 602. The RTTM signals transmitted by the gNodeBs 202-206 may be wideband signals to enable the UE 102 to make precise timing measurements. It can be that no other signals are transmitted in or around the symbols associated with the RTTM signals by any other gNodeB in the neighborhood. This results in low-reuse of the RTTM signals, interference avoidance, and deep penetration of the RTTM signals.

During the downlink subframe 604, the UE 102 may measure the RTTM waveform arrival times (e.g., $t_2$) of each downlink RTTM transmitted by the gNodeBs 202-206 during the downlink subframes 606 and 608. The UE 102 may derive its downlink subframe timing from the downlink signal received from the serving gNodeB on the PDCCH. That is, the UE 102 may set the start time of its PDCCH subframe to the time at which it received the downlink signal from the serving gNodeB.

The UE 102 may be instructed to report its RTT measurements (e.g., the UE processing and turn-around time $(t_3-t_2)$) on the Physical Uplink Shared Channel (PUSCH) during a subsequent uplink subframe, which it may do so during uplink subframe 612. Like the RTTM signals transmitted by the gNodeBs 202-206, the RTTR waveform transmitted by the UE 102 may be a wideband signal to enable the gNodeBs to make precise timing measurements of its arrival.

Each gNodeB in the UE 102's neighborhood (i.e., within communication range of the UE 102; gNodeBs 202-206 in the example of FIG. 6) may receive the RTTR signal from the UE 102. In the example of FIG. 6, the gNodeB 202 receives the RTTR signal from the UE 102 during the uplink subframe 614. Each gNodeB(i) may decode the RTTR signal from the UE 102, and record the respective RTTR waveform arrival time $t_4$. Each gNodeB may then compute the RTT between the gNodeB and the UE 102 based on the RTTR waveform arrival time $t_4$, combined with the timing information in the payload.

A UE-centric RTT estimation is similar to the network-based method described above, except that the UE (e.g., UE 102) transmits RTTM signals (when instructed), which may be received by multiple gNodeBs in the neighborhood of the UE. Each gNodeB(i) responds with an RTTR signal, including the gNodeB processing time $(t_3-t_2)$ in the payload. The UE may determine the RTTR waveform arrival time $t_4$ of the RTTR signal from each gNodeB(i), decode the RTTR signal and extract the gNodeB processing time $(t_3-t_2)$ included in the payload, and compute the RTT for the responding gNodeB(i).

Figure 7:
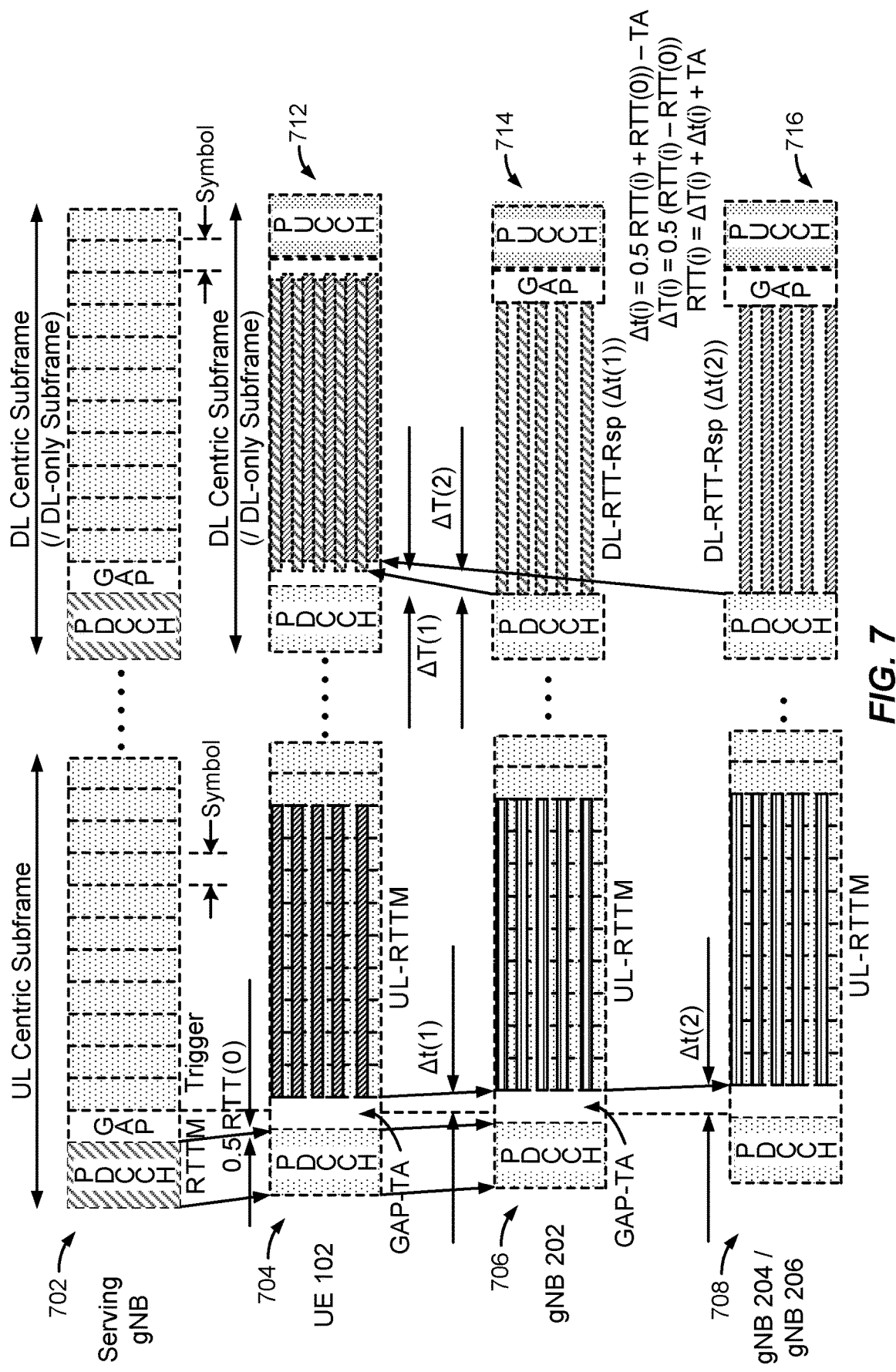
FIG. 7 illustrates an example of the UE-centric RTT estimation according to an aspect of the disclosure.

FIG. 7 illustrates an example of the UE-centric RTT estimation technique according to an aspect of the disclosure. On an uplink-centric (at low duty-cycle) subframe 702, the serving gNodeB may send a control signal (e.g., on the PDCCH) to the UE 102, instructing the UE 102 (and any number of other UEs) to transmit one or more uplink RTTM signals.

During the uplink subframe 704, the UE 102 may transmit one or more RTTM signals at specified (by the serving gNodeB) resource blocks (RBs) of the uplink data portion of the uplink subframe 704, in a TDM or FDM fashion (as illustrated by the horizontal subdivisions of the respective symbols of the uplink subframe 704). The RTTM signals may be wideband signals to enable more precise timing measurements. No other signals are transmitted on the symbols associated with the RTTM signals by any UE in the neighborhood (resulting in low reuse, interference avoidance, and deep penetration of the RTTM signal).

During the uplink subframes 706 and 708, each gNodeB in the neighborhood (i.e., within communication range of the UE 102; gNodeBs 202-206 in the example of FIG. 7) may measure the RTTM waveform arrival time (e.g., $t_2$) of each received RTTM. The serving gNodeB may instruct the UE 102 to scan for/receive RTTR signals from the gNodeBs 202-206 on a subsequent downlink subframe, which occurs in the example of FIG. 7 during the downlink subframes 714 and 716. The RTTR signal from each gNodeB 202-206 may include the gNodeB processing time $(t_3-t_2)$. In an aspect, the RTTR waveforms may be wideband signals to enable the UE 102 to make precise timing measurements.

The UE 102, and each UE in the neighborhood (e.g., all UEs within communication range of the serving gNodeB and gNodeBs 202-206), may decode the RTTR signals from the gNodeBs 202-206 during the downlink subframe 712, and also measure the RTTR waveform arrival time $t_4$ of the RTTR signal from the respective gNodeB(i) of the gNodeBs 202-206.

The RTT may be computed from the RTTR waveform arrival time at the UE 102, combined with timing information in the RTTR (i.e., the gNodeB processing time $(t_3-t_2)$). The RTT estimation procedures disclosed herein can be extended to massive Multiple Input-Multiple Output (MIMO) and to the extremely-high frequency (EHF) region of the spectrum, also known as millimeter wave (mmW) (generally, spectrum bands above 24 GHz) systems. In mmW band systems, as well as massive MIMO systems in any band, gNodeBs may use transmission/reception beamforming to extend signal coverage to the cell edge.

For the network-centric RTT, when the RTTR payload is carried in the PUSCH, it may be carried using an uplink MAC-CE or as part of RRC signaling. For the UE-centric RTT, the RTTR payload may be carried in the PDSCH as part of RRC signaling, or in the MAC-CE, or in the DCI.

Transmit "beamforming" is a technique for focusing an RF signal in a specific direction. Traditionally, when a base station broadcasts an RF signal, it broadcasts the signal in all directions (omni-directionally). With transmit beamforming, the base station determines where a given target device (e.g., UE 102) is located (relative to the base station) and projects a stronger downlink RF signal in that specific direction, thereby providing a faster (in terms of data rate) and stronger RF signal for the receiving device(s). To change the directionality of the RF signal when transmitting, a base station can control the phase and relative amplitude of the RF signal at each transmitter. For example, a base station may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions. It is of course contemplated that the UE can also be a transmitter with beam forming capabilities.

In receive beamforming, the receiver (e.g., gNodeB, UE) uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., Reference Signal Received Power (RSRP), Signal-to-Noise plus Interference Ratio (SINR), etc.) of the RF signals received from that direction.

The term "cell" refers to a logical communication entity used for communication with a base station (e.g., over a carrier), and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Figure 8:
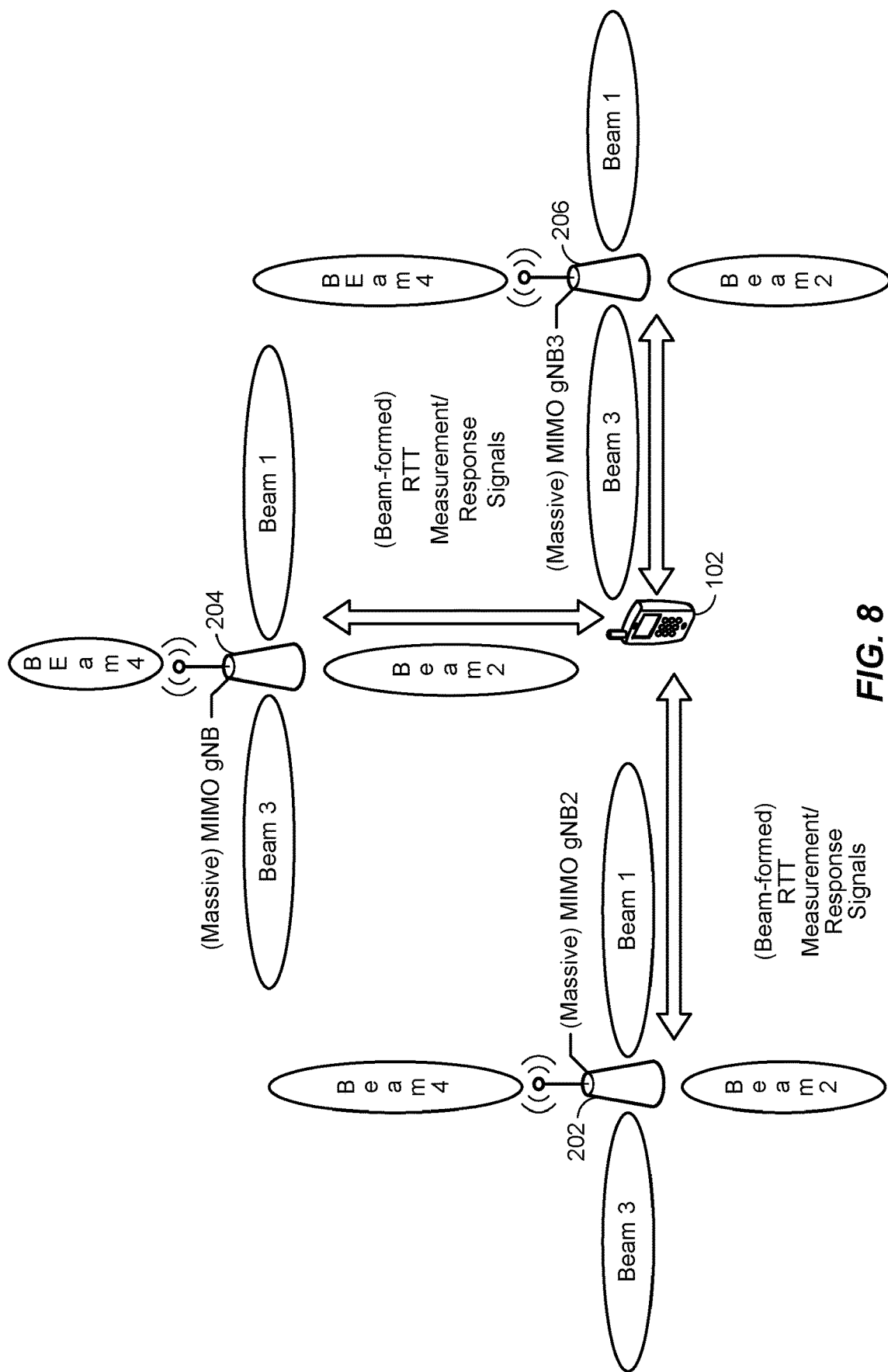
FIG. 8 illustrates an exemplary system in which the RTT estimation procedures disclosed herein are extended to massive Multiple Input-Multiple Output (MIMO) and/or millimeter wave (mmW) systems according to an aspect of the disclosure.

FIG. 8 illustrates an exemplary system in which the RTT estimation procedures disclosed herein are extended to massive MIMO and mmW systems according to an aspect of the disclosure. In the example of FIG. 8, gNodeBs 202-206 are massive MIMO gNodeBs. To perform the RTT estimation procedure described herein in massively beam-formed systems (e.g., MIMO, mmW), each physical gNodeB (e.g., gNodeBs 202-206) can act like a set of multiple "logical gNodeBs," transmitting RTTM or RTTR signals on multiple beams (e.g., beams 1-4) on different time-frequency resources, in a TDM or FDM fashion. The RTTM/RTTR signals may (implicitly or explicitly) carry information about the identity of the gNodeB transmitting the signal, as well as the beam-index (e.g., 1-4) used to transmit them. The UE (e.g., UE 102) may process the RTTM/RTTR signals received on the downlink as if they were transmitted by different gNodeBs. In particular, it may record or report the beam index (or indices) on which the RTT signals were received, in addition to the timestamps (e.g., processing times) described earlier.

During reception, the gNodeBs 202-206 may record/report the beam index on which the RTT signals were received from the UE 102, and include that information in the RTTR payload, along with the timestamps (e.g., processing time) described earlier. In case the gNodeBs 202-206 have fewer RF chains than the number of receive beams it may use (as a single hardware receiver chain may be configurable to generate multiple receive beams), the UE 102 may be commanded to repeat the RTTM/RTTR signals multiple times, so that the gNodeB may sequentially cycle through the set of all receive beams that may be used to receive the RTT signals from the UE 102, based on its limited base-band processing capabilities. Note that different beam directions would result in different directional gains for the different multipath delays. Since RTT and OTDOA positioning methods rely on estimating the direct delay corresponding to the line-of-sight (LOS) path between the transmitter and receiver, it would be of interest to identify the earliest arriving path, and this identification may be improved by using different transmit and receive beams.

An RF chain may be a receiver chain or a transmitter chain, and may be the hardware utilized to receive or transmit RF signals of a given frequency or set of frequencies. More specifically, a receiver chain may include the hardware components of a single hardware receiver of a plurality of hardware receivers of the device, and may include a receive antenna, radio, and modem. Likewise, a transmitter chain may include the hardware components of a single hardware transmitter of a plurality of hardware transmitters of the device, and may include a transmit antenna, radio, and modem. A device (e.g., a gNodeB 202-206 or UE 102) may have multiple receiver/transmitter chains, and may thereby be able to transmit and/or receive RF signals on multiple frequencies at the same time.

In an aspect, in (massive) MIMO systems, either or both of the gNodeBs 202-206 and the UE 102 may repeat their RTTMs/RTTRs multiple times. The different repetitions may use either the same or different transmission beams. When a signal is repeated with the same transmission beam, it may be intended to support reception-beam-sweeping (in addition to coherent-combining if needed) at the receiving end-point (the UE 102 or a gNodeB 202-206).

In an aspect, the angle-of-arrival (AoA)/angle-of-departure (AoD) (at the gNodeB 202-206) associated with the beam-index information may be used in conjunction with RTT estimates to compute the geographic position of the UE (RTT plus AoA/AoD based positioning).

As mentioned above, in RTT-based positioning, the transmitter (e.g., gNodeB/UE) sends an RTTM signal at RTTM waveform transmit time $t_1$, which is received by the receiver (e.g., UE/gNodeB) at RTTM waveform arrival time $t_2$. The receiver responds by transmitting an RTTR signal at RTTR waveform transmit time $t_3$, which is received by the transmitter at RTTR waveform arrival time $t_4$. The total time is then $(t_4-t_1)$. However, since the receiver takes a certain amount of time prior to responding to the receipt of the RTTM waveform, the total time should be discounted by the amount of time taken by the receiver to respond, i.e., the gNodeB/UE processing time $(t_3-t_2)$ to determine the RTT. Hence, RTT=$(t_4-t_1)-(t_3-t_2)$.

Again, note that each bracketed terms are measured by the same entity—RTTM waveform transmit and RTTR waveform arrival times ($t_1$ and $t_4$) are measured by the transmitter, and RTTM waveform arrival and RTTR waveform transmit times ($t_2$ and $t_3$) are measured by the receiver. This means that the each entity may measure the respective times through its internal clock mechanism. But as long as the resulting time components are converted into common duration representations (e.g., number of nanoseconds, number of frames, number of slots, number of OFDM symbols, number of chips, etc.), timing synchronization between the transmitter and the receiver is not needed.

As indicated, the RTTR signal may serve at least two purposes. First, the RTTR waveform may be measured by the transmitter to determine the RTTR waveform arrival time $t_4$. Second, the RTTR payload may inform the transmitter of the processing time $(t_3-t_2)$ at the receiver. In this way, the transmitter may be able to calculate the RTT as $(t_4-t_1)-(t_3-t_2)$, from which the distance between the transmitter and the receiver may be determined through RTT-based positioning (e.g., as an intersection of circles in 2D or spheres) or through OTDOA-based positioning (e.g., as an intersection of hyperbolas or hyperboloids).

As mentioned, RTTR signal may include a waveform and a payload. The waveform allows the transmitter to measure time $t_4$, and the payload carries the receiver's processing time $(t_3-t_2)$ information. Various physical (PHY) layer signals may be used for RTTM and RTTR signals. In an aspect, positioning reference signals (PRS), which is used for OTDOA, may be reused for the RTTM signal. For example, a particular channel state information reference signal (CSIRS) may be configured for RTTM signal. Similarly, a synchronization signal block (SSB) on DL, and sounding reference signal (SRS) on UL may be configured as RTTM signal. In an aspect, these signals may be configured for use in creating OTDOA reports (e.g., RS timing difference (RSTD)), RTT-based reports (e.g., RTTR payload), or both.

The SRS configured for uplink time difference of arrival (UTDOA) and/or RTTR waveforms may be related with a reference RF signal configured for downlink as PRS, RTTM signal, or both. In this regard, the term "related" may refer to quasi-co-location (QCL) or spatialRelationInfo relation, or to a reference RF signal for deriving DL pathloss reference for UL power control. The relation may depend on the periodicity of the SRS—aperiodic, semi-persistent, or periodic. For example, an aperiodic SRS (A-SRS) serving as UL PRS may be QCLed with an aperiodic CSIRS (A-CSIRS) serving as DL PRS. As another example, an A-SRS serving as an RTTR waveform may be QCLed with an A-CSIRS serving as RTTM signal.

Regarding QCL relationship, the following is provided. When signals such as transmit beams are said to be QCL, this indicates that the beams appear to the receiver as having the same parameters, regardless of whether or not the transmitting antennas themselves are physically collocated. In 5G NR, there are four types of QCL relations. Specifically, a QCL relation of a given type means that certain parameters related to the propagation channel experienced by a second signal on a second beam can be derived from information about a first source signal on a source beam. Thus, if the QCL relation type is QCL Type A, the receiver can use the source signal to estimate the Doppler shift, Doppler spread, average delay, and delay spread of a second signal. If the QCL relation type is QCL Type B, the receiver can use the source signal to estimate the Doppler shift and Doppler spread of a second signal. If the QCL relation type is QCL Type C, the receiver can use the source signal to estimate the Doppler shift and average delay of a second signal. If the QCL relation type is QCL Type D, the receiver can use the source signal to estimate the spatial receive parameter (i.e., receive beam) of a second signal. Note that additional QCL types may be defined for future applications, and specifically for positioning-related applications, for example, QCL type E relating to average delay and delay spread. The description herein in general applies to any such QCL relation.

In an aspect, signals used as PRS/RTTM (for network-centric RTT)/RTTR (for UE-centric RTT) may be implicitly QCLed with SSB when frequency division multiplexed with SSB. In this way, the receiver (e.g., the UE) may use the same Rx beam. It is noted that implicit QCL may be a function of the UE's capability. For example, implicit QCL may be used when the UE indicates that it is only capable of a single beam operation.

Recall that RTTR signal includes a waveform for timing and a payload to carry processing time information. In an aspect, the waveform and the payload may be carried on different physical layer resources. For example, when the UE is the receiver of the RTTM, the SRS may be utilized as the RTTR waveform and the payload may be carried on the physical uplink control channel (PUCCH) and/or the physical uplink shared channel (PUSCH).

Regarding the PUCCH, for periodic RTT reporting, the PUCCH resources for the payload may be configured in a manner similar to the resources configured for scheduling request (SR). For semi-persistent reporting, the PUCCH resources for the payload may be configured in a manner similar to the resources configured for semi-persistent CSI (SP-CSI) reports. For aperiodic RTT reporting, the PUCCH resources for the payload may be indicated in a message that triggers the RTT procedure (e.g., informing of upcoming RTTM signal, requesting for the aperiodic RTT reporting, etc.). The uplink control information (UCI)-on-PUSCH rules may be extended to include the RTTR payloads. For example, the payload may be bundled with or may be treated as being included in the CSI-report payloads. Alternatively, a new UCI type may be defined similar to existing UCI types (Ack, CSI-part1, CSI-part2, etc.), and it may be multiplexed together with existing UCI types following a priority rule (e.g., multiplexed after CSI-part1 and prior to CSI-part2).

Regarding the PUSCH, for periodic and semi-persistent reporting, the PUSCH resources maybe configured in a manner similar to that specified for configured-scheduling grants in Release 15 (Rel15) of Third Generation Partnership Project (3GPP) NR, or similar to semipersistent scheduling (SPS) in Long Term Evolution (LTE). For aperiodic RTT reporting, the PUSCH resources for the payload may be scheduled or otherwise configured as part of normal UL grant. The message that triggers the RTT may also identify which grant indicates the PUSCH resource for the RTTR payload. Alternatively, the UL grant may be included as part of the triggering message.

The QCL/spatialRelationInfo and DL pathloss reference for RTTR payload may be same or similar as that for the RTTR waveform discussed above. In an aspect, one of the RTTR waveform and payload may reuse the Rel15 approach to indicate QCL and pathloss reference. The other of the RTTR waveform and payload may simply follow the first one, and thus bypassing the Rel15 approach. Which of the RTTR waveform and payload reuses the Rel15 approach may be indicated by radio resource control (RRC) message, MAC control element (MAC-CE) message, DCI message, etc. For example, the message that triggers the RTT procedure may indicate which of the RTTR waveform and payload will reuse the Rel15 approach.

Separating out the RTTR waveform from the payload provides flexibility. For example, SRS has a flexible bandwidth (BW) meaning that the SRS BW can be adjusted to enable measuring the RTTR waveform arrival time $t_4$ time to a desired accuracy level. Also, the PUSCH and/or PUCCH can be sized depending on the payload. For example, there may be a number of UE processing times $(t_3-t_2)$ that are reported due to the number of cells and/or beams to be reported, which can result in a variable payload size depending on the number of processing times reported.

Alternatively, the same signal may be used for both the RTTR waveform and payload. For example, recall that the SRS may be used as the RTTR waveform. In an aspect, part or all of the payload may also be carried on the SRS. Different SRS resources, e.g., sequences, cyclic shifts, etc., may be used to carry the payload. SRS does have a limited payload capacity, since an N bit payload to be carried on SRS requires reserving $2^N$ SRS resources (for example, with different cyclic shifts, PN sequences, tone offsets, or OFDM symbol allocations), with payload information being conveyed using the resource selection among these $2^N$ resources. Nonetheless, it can be useful in cases where reporting of $(t_3-t_2)$ does not require significant resources. For example, SRS may be used to report a differential of the UE processing time $(t_3-t_2)$ across time. As an illustration, only a quantized version of the change in $(t_3-t_2)$ between current and previous RTT occasions may be reported.

Demodulation reference signal (DMRS) is another signal that may serve as RTTR waveform. In this instance, the resource blocks (RBs) of the PUSCH/PUCCH for the DMRS may carry the RTTR payload. The number of RBs PUSCH/PUCCH for the DMRS may be sufficient to allow for desired accuracy. For example, there may be a significant number of $(t_3-t_2)$ due to multiple cells and beams, or due to multiplexing of the payload with usual UL data on PUSCH which requires a large PUSCH RB allocation.

Similar to the QCL described above, other grant-related parameter may also be common. For example, waveform and payload may always occupy the same slot. More generally, there may be a fixed offset in time (e.g., fixed slot offset) and a fixed offset in frequency (e.g., fixed subcarrier offset). This means that when a slot is indicated for the waveform, there is no need to separately indicate the slot for the payload and vice versa.

The considerations described above regarding combined or separate transmission of RTTR payload and RTTR waveform, as well as their resource allocation (including QCL relation), refer to the case of network-centric RTT, where UE is the recipient of RTTM. However, the concepts can directly be extended to UE-centric RTT as well. For example, in this case, the RTTR payload may be carried on PDCCH or PDSCH, and the RTTR waveform may be a separate CSIRS or SSB, or may be the DMRS of the PDCCH or PDSCH. The waveform and payload may be have the same spatial Rx QCL (i.e., may be receivable using the same Rx beam), and may share other resource-allocation attributes such as slot index.

The UE may measure the processing time $(t_3-t_2)$ in units of the UE's internal timing. For example, the UE may report the processing time in any combination of nanoseconds, frames, slots, OFDM symbols, chips, etc. with the proviso that the network (e.g., serving gNodeB, location server) understands the reported time units.

Note that the chip timing for UL transmission—e.g., the RTTR transmission time $t_3$—is itself subject to change due to various factors. For example, the chip timing can change due to timing advance (TA) commands from the gNodeB. Alternatively or in addition thereto, the UE can make autonomous "slew-rate" corrections upon detecting DL timing slew. In an aspect, the UE may take into account the impact of such changes when computing the processing time ($t_3-t_2$) in units of chip time. In this way, the reported UE processing time ($t_3-t_2$) corresponds to true ($t_3-t_2$) rather than some UE-internal reference that is subject to change; i.e., any such UE-autonomous adjustment performed in between the time of RTTM reception (corresponding to $t_2$) and RTTR transmission (corresponding to $t_3$) must be accounted for in the reporting of ($t_3-t_2$).

The UE can also report on the detected DL timing changes from different gNodeBs. This can aid the gNodeBs to synchronize their clocks better. It can also aid the tracking the UE's movement as well. Therefore, in an aspect, the RTTR payload may also include the detected DL timing changes of one or more gNodeBs, in addition to the UE processing times.

Figure 9:
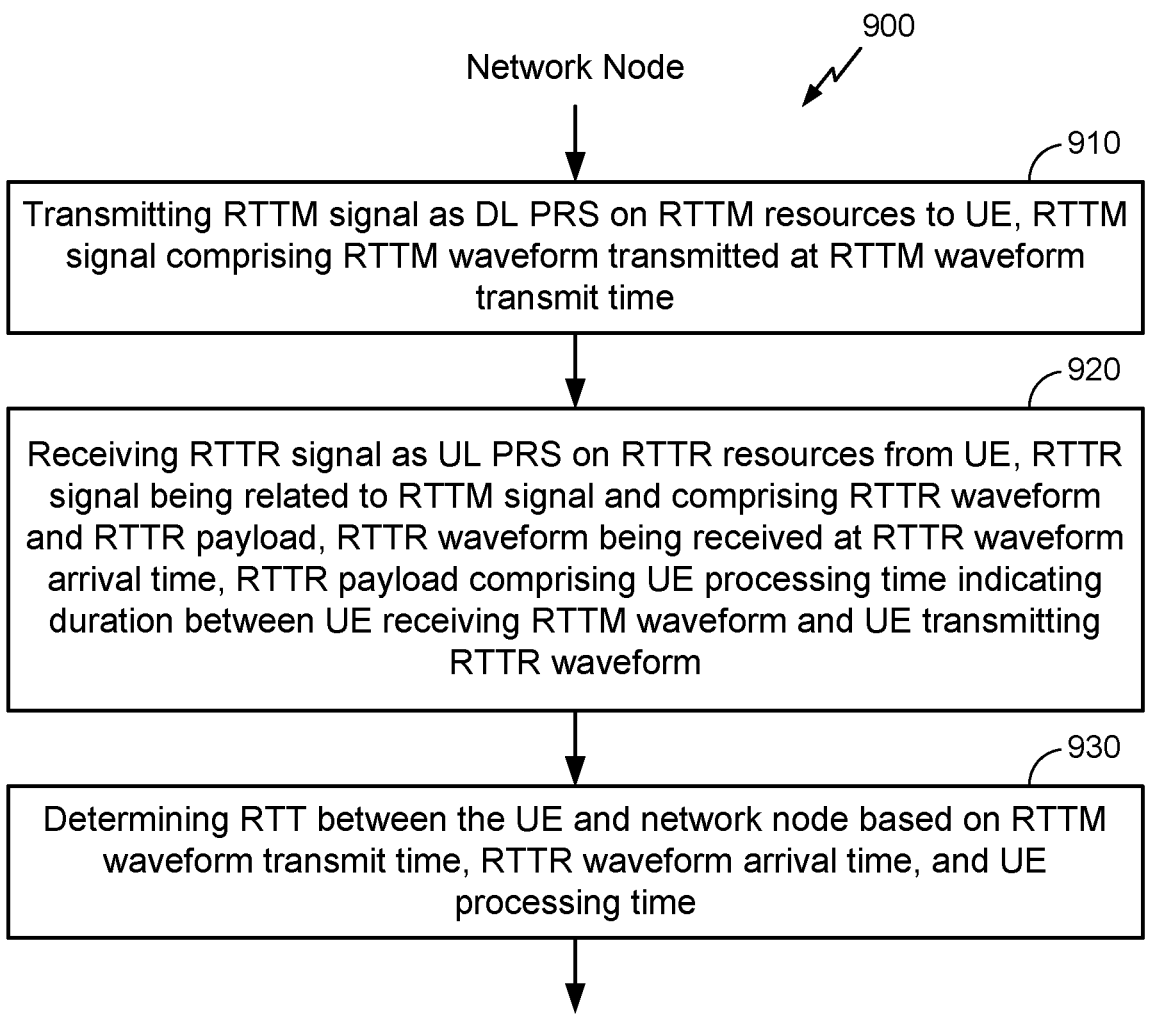
FIGS. 9-12 illustrate exemplary methods performed by a network node including a serving node according to an aspect of the disclosure.

FIG. 9 illustrates an exemplary network-centric method 900 for determining an RTT of a UE (e.g., UE 102) performed by a network node, which may be a base station (e.g., any of gNodeBs 202-206) or a cell (e.g., a cell of any of gNodeBs 202-206). In network-centric situation, RTTM signals may be downlink positioning reference signals (DL PRS) and RTTR signals may be uplink PRSs. The network node may be a serving node serving the UE or a network node neighboring the serving node. In an aspect, the memory component 340 of the apparatus 304 in FIG. 3 may be an example of an example of a non-transitory computer-readable medium storing computer-executable instructions of a network node to perform the method 900. In another aspect, the method 900 may be performed by the communication device 314 (which may be wired or wireless), the communication device 320 (which may also be wired or wireless), the processing system 334, the memory component 340, and/or the RTT measurement component 354 of the apparatus 304 in FIG. 3.

In block 910, the network node may transmit a RTTM signal on RTTM resources to the UE. The RTTM signal may comprise RTTM waveform transmitted from the network node at RTTM waveform transmit time $t_1$. The RTTM resources may comprise downlink physical layer resources. For example, CSIRS, PRS, TRS, and/or SSB may be configured for use as the RTTM waveform. These may also be examples of DL PRSs.

The RTTM signal may be one of one or more RTTM signals transmitted to the UE. Each RTTM waveform transmit time may be independent of other RTTM waveform transmit times. The network node may adjust the bandwidths of the RTTM waveforms to enable the UE to accurately measure their arrival times at the UE.

In block 920, the network node may receive a RTTR signal on RTTR resources from the UE. The RTTR signal may be related to the RTTM signal. For example, they may have a QCL or spatialRelationInfo relation, or to a relation for deriving DL pathloss reference for UL power control. They may also be related in a sense that the RTTR signal is transmitted from the UE in response to receiving the RTTM signal. Further, the RTTM resources scheduled/configured on the DL physical layer resources and the RTTR resources scheduled/configured on the UL physical layer resources may have predetermined relationships to each other.

The RTTR signal may comprise a RTTR waveform and a RTTR payload. The RTTR resources may comprise uplink physical layer resources. For example, uplink SRS may be configured for use as the RTTR waveform. This may also be an example of a UL PRS. As another example, PUCCH and/or PUSCH resources may be allocated to carry the RTTR payload. The PUCCH/PUSCH may be sized based on the payload (e.g., may be sized based on the amount of UE processing times to be reported, amount of DL timing information to be reported, etc.).

The RTTR waveform may be received at the RTTR waveform arrival time $t_4$. Also, the RTTR payload may comprise UE processing time ($t_3-t_2$) which indicates a duration between the UE receiving the RTTM waveform and the UE transmitting the RTTR waveform, i.e., the difference between the RTTR waveform transmit time $t_3$ and the RTTM waveform arrival time $t_2$.

The RTTR waveform and payload may be configured to be carried on same UL physical layer resources. Alternatively, the RTTR waveform and payload may be configured to be carried on different UL physical layer resources. In an aspect, the RTTR payload may be received on one or more RRC messages.

The RTTR signal may be one of one or more RTTR signals received from the UE. Each of the received RTTR signals may correspond to one or more of the transmitted RTTM signal.

In an aspect, a plurality of RTTM signals may be transmitted in block 910 and a plurality of RTTR signals may be received in block 920. For example, the network node may utilize a plurality of transmit beams to communicate with the UE (e.g., different transmit beams are used at different junctures when the UE is moving). The plurality of RTTM signals may be transmitted on the plurality of transmit beams of the network node and received by the UE on its plurality of receive beams. Correspondingly, the UE may transmit a plurality of RTTR signals on its own plurality of transmit beams and received by the network node on its plurality of receive beams.

In block 930, the network node may determine the RTT between the UE 102 and the network node based on a combination of the RTTM waveform transmit time $t_1$, the RTTR waveform arrival time $t_4$, and the UE processing time ($t_3-t_2$). Alternatively or in addition thereto, the network node may provide the information to a network entity (e.g., location management function (LMF), location server, etc.) and/or to a serving node to determine the RTT.

Figure 10:
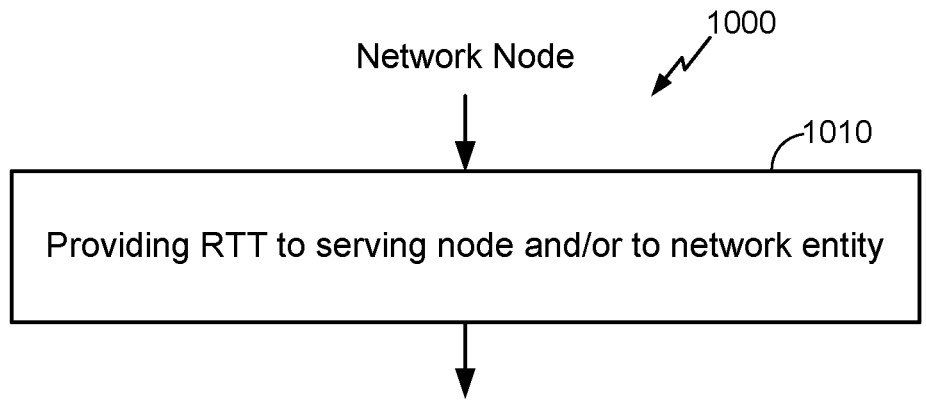

FIG. 10 illustrates an exemplary network-centric method 1100 performed by a non-serving node. Subsequent to block 930, the network node may provide the determined RTT to the serving node, e.g., through X2 interface messages. Alternatively or in addition thereto, the network node may provide the determined RTT to a network entity, e.g., through NR-PPa protocol messages.

Figure 11:
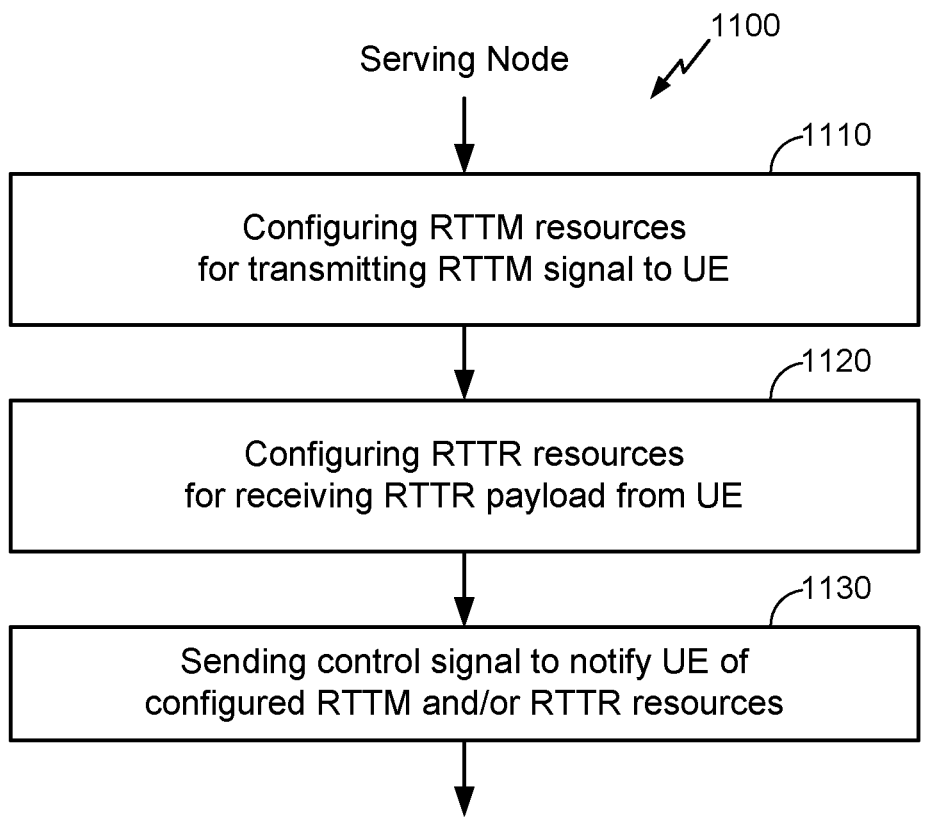

To enable the UE to receive the RTTM signal and transmit the RTTR signal, the UE may be notified of the resources allocated for the RTTM and RTTR signals. FIG. 11 illustrates an exemplary network-centric method 1100 performed by a serving node serving the UE. The serving node may be a base station (e.g., any of gNodeBs 202-206) or a cell (e.g., a cell of any of gNodeBs 202-206). The serving node performing the method 1100 may also be one of the network nodes that perform the method 900. The method 900 may occur subsequent to the method 1100.

In an aspect, the memory component 340 of the apparatus 304 in FIG. 3 may be an example of an example of a non-transitory computer-readable medium storing computer-executable instructions of a network node to perform the method 1100. In another aspect, the method 1100 may be performed by the communication device 314, the processing system 334, and/or the memory component 340 of the apparatus 304 in FIG. 3.

In block 1110, the serving node may configure/schedule RTTM resources for transmitting the RTTM signal to the UE. In block 1120, the serving node may configure/schedule RTTR resources for receiving the RTTR payload from the UE. The RTTR waveform may be configured by a network entity (e.g., LMF, location server, etc.). Alternatively or in addition thereto, the serving node may configure/schedule RTTR resources for receiving the RTTR waveform from the UE. That is, the serving node may configure the RTTR resources for the RTTR signal including the waveform and the payload.

In block 1130, the serving node may send a control signal to the UE. The control signal may notify the UE of the configured RTTM resources so that the UE can properly listen for the RTTM waveform. The control signal may notify the UE 102 of the configured RTTR resources (for RTTR payload only or for both RTTR waveform and payload) so that the UE 102 can transmit the RTTR waveforms and the RTTR payload on the proper resources.

Figure 12:
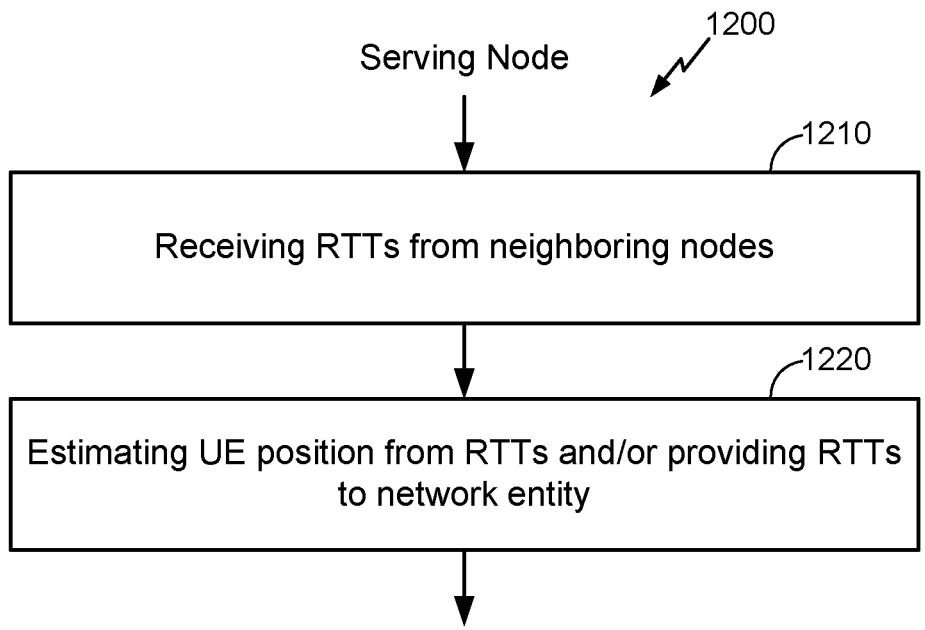

When RTTs are determined between the UE and a plurality of network nodes (e.g., gNodeBs 202-206), the position of the UE can be estimated. FIG. 12 illustrates an exemplary network-centric method 1200 performed by the serving node to determine the position of the UE. To accommodate the UE positioning determination, the control signal sent in block 1130 of the method 1100 may notify the UE of a plurality of network nodes that will be transmitting corresponding plurality of RTTM signals to the UE. For example, the control signal can notify the UE of a plurality RTTM resources configured for the plurality of network nodes. Also, the RTTR resources for the RTTR payload configured in block 1120 should be sufficient to carry a plurality of UE processing times corresponding to the plurality of RTTR waveforms transmitted from the plurality of network nodes. Then in block 920 of the method 900, the received RTTR payload may include the plurality of UE processing times ($t_3-t_2$). The plurality of network nodes may be neighboring network nodes within communication range of the UE.

In an aspect, the memory component 340 of the apparatus 304 in FIG. 3 may be an example of an example of a non-transitory computer-readable medium storing computer-executable instructions of a network node to perform the method 1200. In another aspect, the method 1200 may be performed by the communication device 314, the processing system 334, and/or the memory component 340 of the apparatus 304 in FIG. 3.

To determine the position of the UE, in block 1210, the serving node may receive (e.g., through the X2 interface) a plurality of RTTs from the plurality of neighboring nodes, where each neighboring node has calculated the RTT between that neighboring node and the UE. In other words, each neighboring node may have performed block 930.

In block 1220, the serving node may estimate the UE's position based on the plurality of RTTs. If the serving node has performed the method 900, the RTT determined between the UE and the serving node may also be considered. Alternatively or in addition thereto, the serving node may provide the RTTs to a network entity (LMF, location server, etc.) to estimate the UE's position, e.g., through NR-PPa messages.

In addition to the plurality of UE processing times, the RTTR payload may also include a plurality of DL timing reports corresponding to the plurality of base stations. Each DL timing report may indicate a change in the DL timing from the corresponding base station as detected by the UE. Recall that such information may be utilized to aid the base stations (e.g., gNodeBs 202-206) to better synchronize their clocks. The DL timing report may also aid in tracking the UE's movement.

In an aspect, the network node may adjust the bandwidth of the RTTM waveform transmitted in block 910 of the method 900 to enable the UE to measure the RTTM waveform arrival time $t_2$ to a required accuracy for RTT. For example, if high accuracy is required (e.g., in E911 situations), the bandwidth of the RTTM waveform may be widened. On the other hand, if a relatively course accuracy is sufficient, then the bandwidth of the RTTM waveform may be narrowed. Also to meet the required RTT accuracy, the control signal sent in block 1130 of the method 1100 may specify a bandwidth of the RTTR waveform.

In an aspect, the RTTR waveform and the RTTR payload may be configured on different UL physical layer resources. For example, the UL SRS may be configured (e.g., by the network entity and/or the serving node) for use as the RTTR waveform, and the PUCCH, or the PUSCH, or both may be configured (e.g., by the serving node) to carry RTTR payload. In such instances, the control signal sent to the UE in block 1130 of the method 1100 may explicitly indicate both the UL resource configured for the RTTR waveform (e.g., SRS) and the UL resource configured for the RTTR payload (e.g., one or both of the PUCCH and PUSCH). One or both of the PUCCH and PUSCH may be configured for periodic RTT reporting, semi-persistent RTT reporting, and/or aperiodic RTT reporting.

Recall from above that in some instances, there may be a QCL/spatialRelationInfo between the RTTR waveform and the RTTR payload. In other words, the UL physical layer resources for the RTTR waveform and for the RTTR payload may be configured in a manner such that the respective resources are offset from each other in time (e.g., fixed slot offset), or in frequency (e.g., fixed subcarrier offset), or both. In such a circumstance, the control signal sent in block 1130 of the method 1100 may explicitly indicate the resources configured for the RTTR waveform or for the RTTR payload, but need not explicitly indicate both. When one is specified, the other is implicitly specified, and the UE will know the exact resources configured for the other.

In an aspect, the fixed slot offset and the fixed subcarrier offset may be predetermined. Alternatively or in addition thereto, the serving node may provide the offset values for one or both of the fixed slot offset and the fixed subcarrier offset through any one or more of RRC, MAC-CE, and DCI messages. The UE would simply replace old offset values with the new offset values provided by the serving node.

In an aspect, the RTTR waveform and the RTTR payload may be configured on same UL physical layer resources. For example, in addition to the SRS being used as the RTTR waveform, some or all of the RTTR payload may also be carried on the SRS. For example, the RTR payload information (the UE processing times, DL timing reports) may be conveyed through SRS sequences and cyclic shifts. Due to the limited capacity of the SRS, the UE processing time in the RTTR payload may indicate a differential change in the UE processing time (a quantized version) between previous and current RTT occasions.

As another example, the DMRS of the PUCCH or the DMRS of the PUSCH may serve as the RTTR waveform. In this instance, the resource blocks (RBs) of the PUCCH or the PUSCH corresponding to the DMRS may carry the RTTR payload.

Just as there can be a QCL/spatialRelationInfo between the RTTR waveform and the RTTR payload, there can also be a relationship between the configured RTTM and RTTR resources. In other words, the serving node may schedule the RTTM resources on the DL physical layer resources and schedule the RTTR resources on the UL physical layer resources with a known predetermined relationship to each other. In this instance, the control signal in block 1130 of the method 1100 need only explicitly indicate the RTTM resources or the RTTR resources, but does not need to explicitly specify both. When one is specified, the other is implicitly specified, and the UE will know the exact resources configured for the other.

Figure 13:
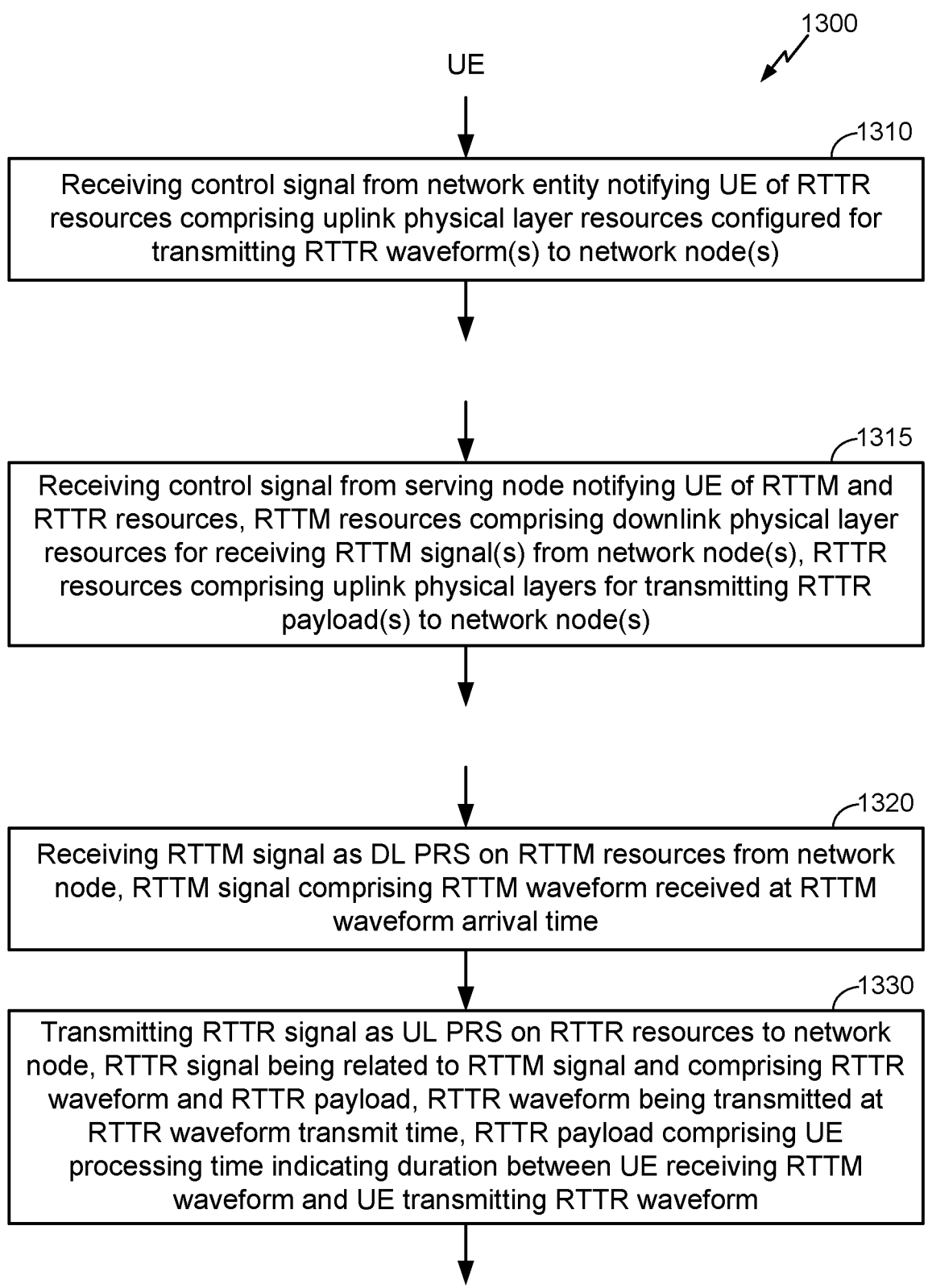
FIG. 13 illustrates an exemplary method performed by a UE according to an aspect of the disclosure.

FIG. 13 illustrates an exemplary network-centric method 1300 performed by a UE. In an aspect, the memory component 338 of the apparatus 302 in FIG. 3 may be an example of an example of a non-transitory computer-readable medium storing computer-executable instructions of a UE to perform the method 1300. In another aspect, the method 1300 may be performed by the communication device 308 (which may be wired or wireless), the processing system 332, and/or the memory component 338 of the apparatus 304 in FIG. 3.

In block 1310, the UE may receive a control signal from a network entity (e.g., LMF, location server, etc.). The control signal may notify the UE of RTTR resources configured by the network entity. The RTTR resources may comprise uplink physical layer resources for transmitting one or more RTTR waveforms to the one or more network nodes. The control signal may be received as one or more LPPa messages.

In block 1315, the UE may receive a control signal from a serving node. The control signal may notify the UE of RTTM and RTTR resources configured by the serving node. The RTTM resources may comprise downlink physical layer resources for receiving one or more RTTM signals from one or more network nodes, and the RTTR resources may comprise uplink physical layer resources for transmitting RTTR payloads to the one or more network nodes.

It is seen that the RTTR resources for the RTTR signal (RTTR waveform, RTTR payload) may be configured by the network entity (in block 1310) and the serving node (in block 1315). But in another aspect, the serving node may configure the resources for both RTTR waveforms and RTTR payloads in block 1315.

In block 1320, the UE may receive a RTTM signal from a network node on the RTTM resources. The RTTM signal may comprise RTTM waveform received at the RTTM waveform arrival time $t_2$. The RTTM signal may be one of one or more RTTM signals transmitted by the network node. Each RTTM waveform transmit time may be independent of other RTTM waveform transmit times. The network node may adjust the bandwidths of the RTTM waveforms to enable the UE to accurately measure their arrival times at the UE.

In block 1330, the UE may transmit a RTTR signal on RTTR resources to the network node. The RTTR signal may be related to the RTTM signal. The RTTR signal may comprise a RTTR waveform and a RTTR payload. The RTTR waveform may be transmitted at the RTTR waveform transmit time $t_3$. Also, the RTTR payload may comprise UE processing time $(t_3-t_2)$ which indicates a duration between the UE receiving the RTTM waveform and the UE transmitting the RTTR waveform. The RTTR signal may be one of one or more RTTR signals transmitted by the UE. Each of the transmitted RTTR signals may correspond to one or more of the received RTTM signal.

In an aspect, a plurality of RTTM signals may be received in block 1320 and a plurality of RTTR signals may be transmitted in block 1330. For example, the network node may utilize a plurality of transmit beams to communicate with the UE (e.g., different transmit beams are used at different junctures when the UE is moving). The plurality of RTTM signals may be transmitted on the plurality of transmit beams of the network node and received by the UE on its plurality of receive beams. Correspondingly, the UE may transmit a plurality of RTTR signals on its own plurality of transmit beams and received by the network node on its plurality of receive beams.

In FIG. 13, blocks 1310, 1315 are separated from blocks 1320. This is to indicate that blocks 1310, 1315 need not be performed concurrently with blocks 1320, 1330.

Figure 14:
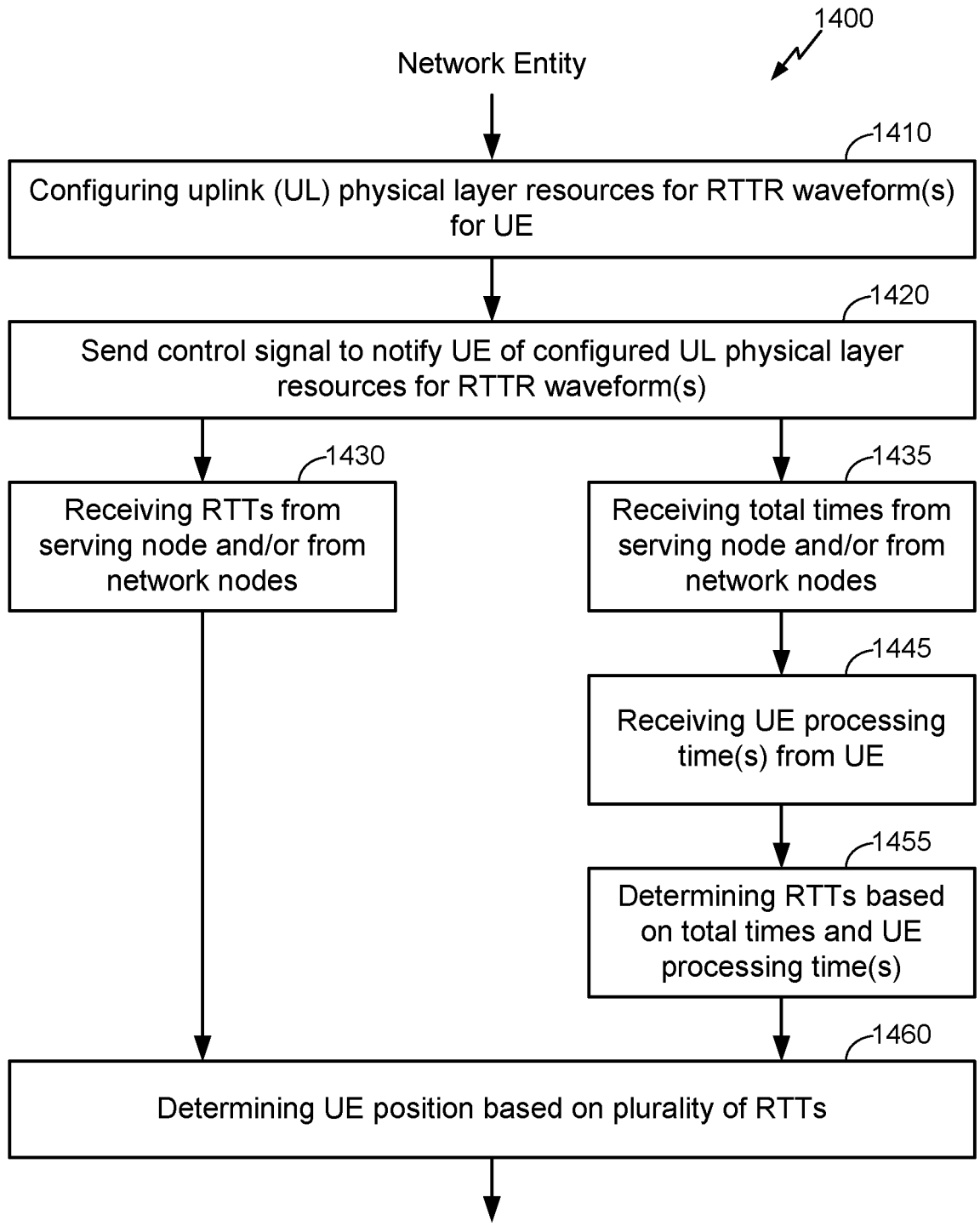
FIG. 14 illustrates an exemplary method performed by a network entity according to an aspect of the disclosure.

FIG. 14 illustrates an exemplary network-centric method 1400 for determining an RTT of a UE (e.g., UE 102) performed by a network entity, which may be a LMF, location server, etc. In an aspect, the memory component 342 of the apparatus 304 in FIG. 3 may be an example of an example of a non-transitory computer-readable medium storing computer-executable instructions of a network node to perform the method 900. In another aspect, the method 1400 may be performed by the communication device 326 (which may be wired or wireless), the processing system 336, the memory component 342, and/or the RTT measurement component 356 of the apparatus 306 in FIG. 3.

In block 1410, the network entity may configure uplink physical layer resources for RTTR waveforms (e.g., CSIRS, PRS, TRS, and/or SSB) for transmission by the UE to one or more network nodes. In block 1420, the network entity may send a control signal to the UE to notify the UE, e.g., through one or more LPP messages, of the scheduled resources. In an aspect, the network entity may set the bandwidth of the RTTR to meet desired or required accuracy through the control signal.

In block 1430, the network entity may receive a plurality of RTTs. The plurality of RTTs may be received from the serving node. Alternatively, the plurality of RTTs may be received individually from the plurality of network nodes. The RTTs may be received as NR-PPa messages. In block 1460, the network entity may determine the UE's position based on the plurality of RTTs.

Alternatively, in block 1435, the network entity may receive a plurality of total times, i.e., plurality of $(t_4-t_1)$. The total times may be received from the serving node. Alternatively, the total times may be received individually from the plurality of network nodes. The total times may be received as NR-PPa messages. In block 1445, the network entity may receive one or more UE processing times $(t_3-t_2)$ corresponding to the plurality of total times. In block 1455, the network entity may determine the plurality of RTTs based on the plurality of total times and the UE processing time(s). In block 1460, the network entity may determine the UE's position based on the plurality of RTTs.

Figure 15:
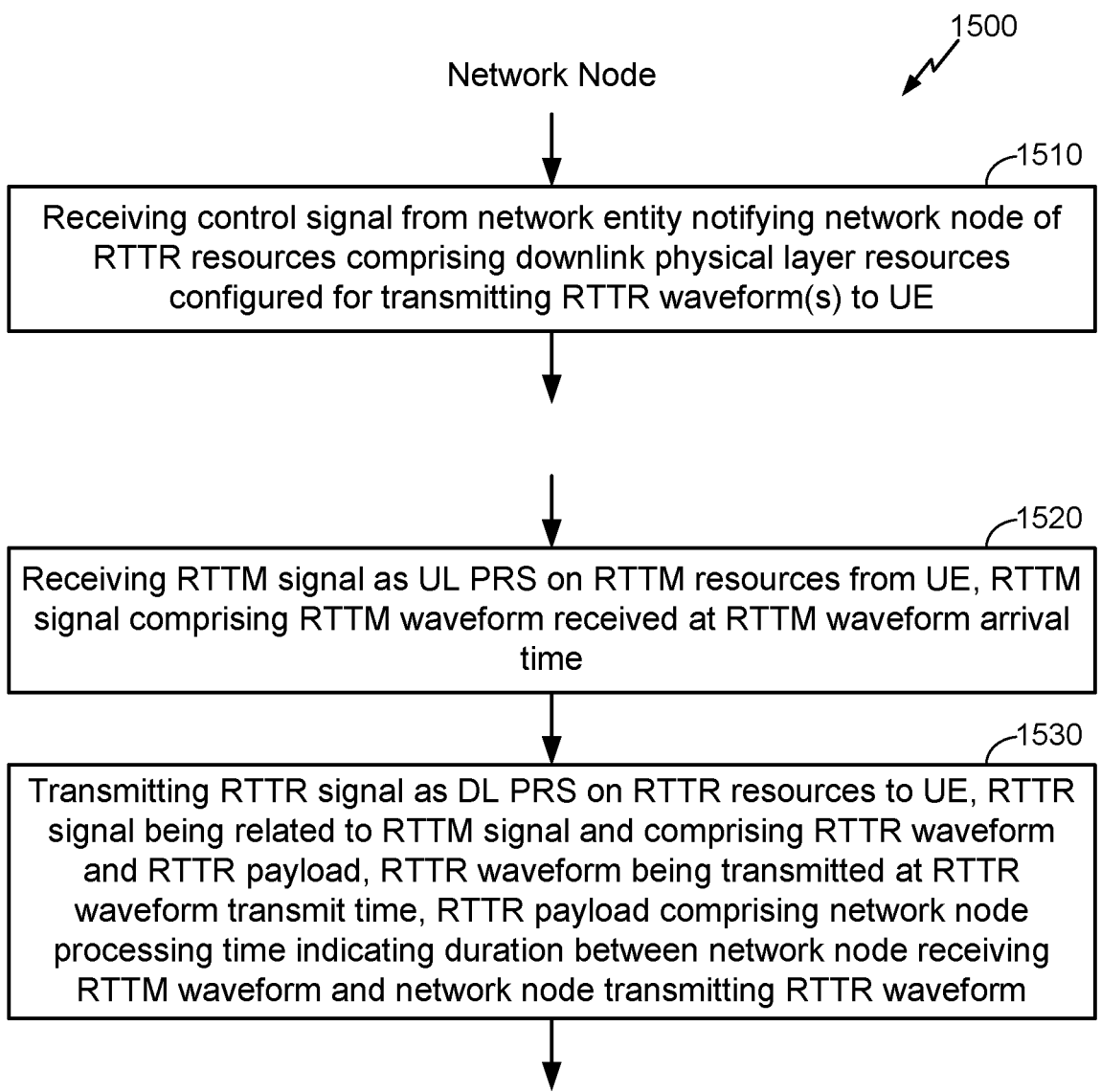
FIGS. 15-18 illustrate exemplary methods performed by a network node including a serving node according to an aspect of the disclosure.

FIG. 15 illustrates an exemplary UE-centric method 1500 for determining an RTT of a UE performed by a network node. In UE-centric situation, RTTM signals may be UL PRSs (e.g., SRS, DMRS, etc.) and RTTR signals may be DL PRSs (e.g., CSIRS, SSB, etc.). The network node may be a serving node serving the UE or a network node neighboring the serving node. In an aspect, the memory component 340 of the apparatus 304 in FIG. 3 may be an example of an example of a non-transitory computer-readable medium storing computer-executable instructions of a network node to perform the method 1500. In another aspect, the method 1500 may be performed by the communication device 314 (which may be wired or wireless), the communication device 320 (which may also be wired or wireless), the processing system 334, the memory component 340, and/or the RTT measurement component 354 of the apparatus 304 in FIG. 3.

In block 1510, the network node may receive a control signal from a network entity (e.g., LMF, location server, etc.). The control signal may notify the network node of RTTR resources configured by the network entity. The RTTR resources may comprise downlink physical layer resources for transmitting one or more RTTR waveforms to the UE. The control signal may be received as one or more NR-PPa messages.

It is seen that the RTTR resources for the RTTR signal (RTTR waveform, RTTR payload) may be configured by the network entity (in block 1510). But in another aspect, the serving node may configure the resources for both RTTR waveforms and RTTR payloads.

In block 1520, the network node may receive a RTTM signal from the UE on the RTTM resources. The RTTM signal may comprise RTTM waveform received at the RTTM waveform arrival time $t_2$. The UE may adjust the bandwidth of the RTTM waveforms (e.g., upon setting by a serving node) to enable the network node to accurately measure their arrival times at the network node.

In block 1530, the network node may transmit a RTTR signal on RTTR resources to the UE. The RTTR signal may be related to the RTTM signal. The RTTR signal may comprise a RTTR waveform and a RTTR payload. The RTTR waveform may be transmitted at the RTTR waveform transmit time $t_3$. Also, the RTTR payload may comprise network node processing time $(t_3-t_2)$ which indicates a duration between the network node receiving the RTTM waveform and the network node transmitting the RTTR waveform. The RTTR signal may be one of one or more RTTR signals transmitted by the network node. Each of the transmitted RTTR signals may correspond to one or more of the received RTTM signals.

In an aspect, a plurality of RTTM signals may be received in block 1520 and a plurality of RTTR signals may be transmitted in block 1530. For example, the UE may utilize a plurality of transmit beams to communicate with the network node (e.g., different transmit beams are used at different junctures when the UE is moving). The plurality of RTTM signals may be transmitted on the plurality of transmit beams of the UE and received by the network node on its plurality of receive beams. Correspondingly, the network node may transmit a plurality of RTTR signals on its own plurality of transmit beams and received by the UE on its plurality of receive beams.

In FIG. 15, block 1510 is separated from blocks 1520, 1530. This is to indicate that block 1510 need not be performed concurrently with blocks 1520, 1530.

Figure 16:
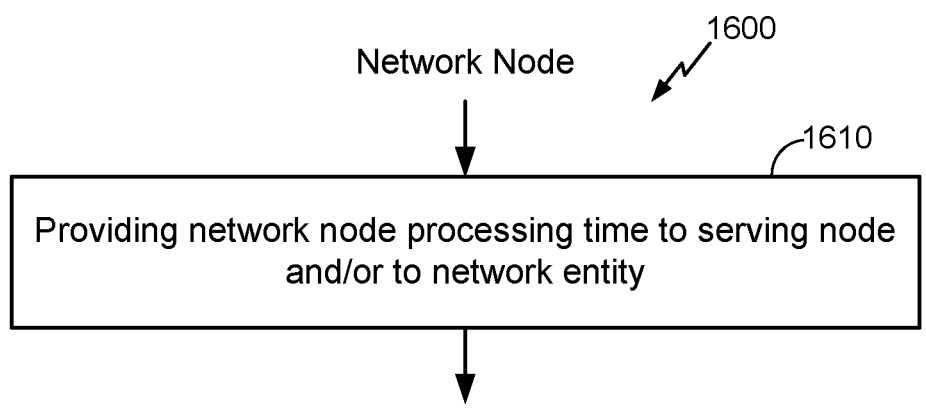

FIG. 16 illustrates an exemplary UE-centric method 1600 performed by a non-serving node. Subsequent to block 1530, the network node may provide its network node processing time to the serving node, e.g., through X2 interface messages. Alternatively or in addition thereto, the network node may provide its network node processing time to a network entity, e.g., through NR-PPa protocol messages.

Figure 17:
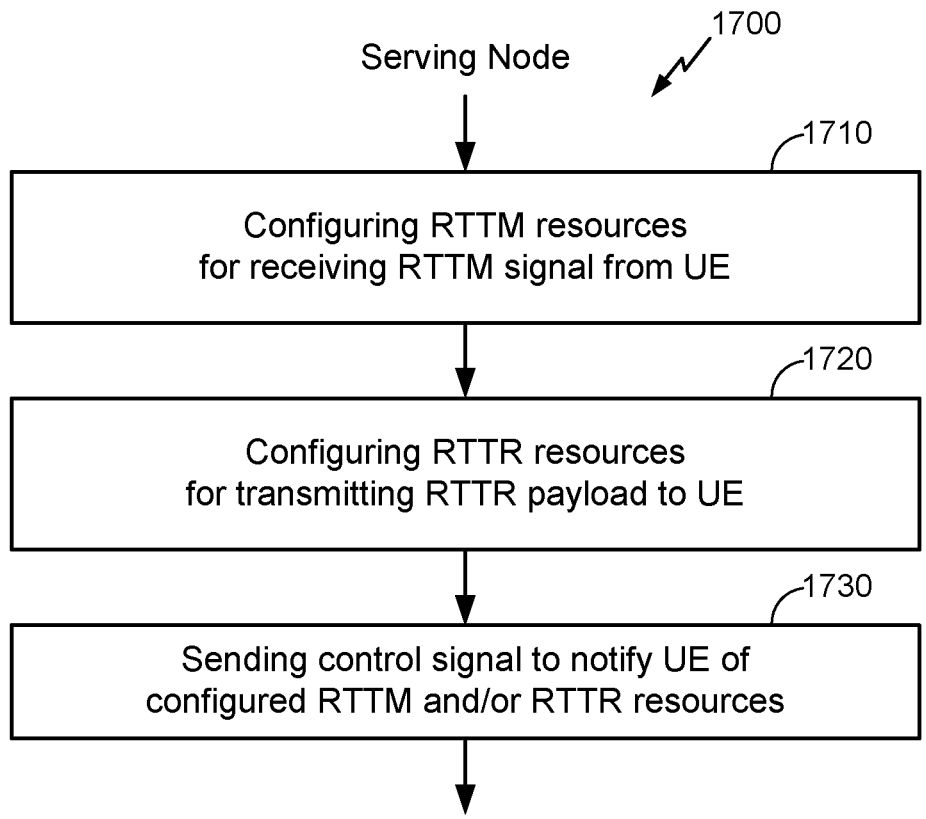

To enable the UE to transmit the RTTM signal and receive the RTTR signal, the UE may be notified of the resources allocated for the RTTM and RTTR signals. FIG. 17 illustrates an exemplary UE-centric method 1700 performed by a serving node serving the UE. The serving node may be a base station (e.g., any of gNodeBs 202-206) or a cell (e.g., a cell of any of gNodeBs 202-206). The serving node performing the method 1700 may also be one of the network nodes that perform the method 1500. The method 1500 may occur subsequent to the method 1700.

In an aspect, the memory component 340 of the apparatus 304 in FIG. 3 may be an example of an example of a non-transitory computer-readable medium storing computer-executable instructions of a network node to perform the method 1700. In another aspect, the method 1700 may be performed by the communication device 314, the processing system 334, and/or the memory component 340 of the apparatus 304 in FIG. 3.

In block 1710, the serving node may configure/schedule RTTM resources for receiving the RTTM signals from the UE. In block 1720, the serving node may configure/schedule RTTR resources for transmitting the RTTR payload to the UE. The RTTR waveform may be configured by a network entity (e.g., LMF, location server, etc.). Alternatively or in addition thereto, the serving node may configure/schedule RTTR resources for transmitting the RTTR waveform to the UE. That is, the serving node may configure the RTTR resources for the RTTR signal including the waveform and the payload.

In block 1730, the serving node may send a control signal to the UE. The control signal may notify the UE of the configured RTTR resources so that the UE can properly transmit the RTTM waveform. The control signal may notify the UE 102 of the configured RTTR resources (for RTTR payload only or for both RTTR waveform and payload) so that the UE 102 can receive the RTTR waveforms and the RTTR payload on the proper resources.

Figure 18:
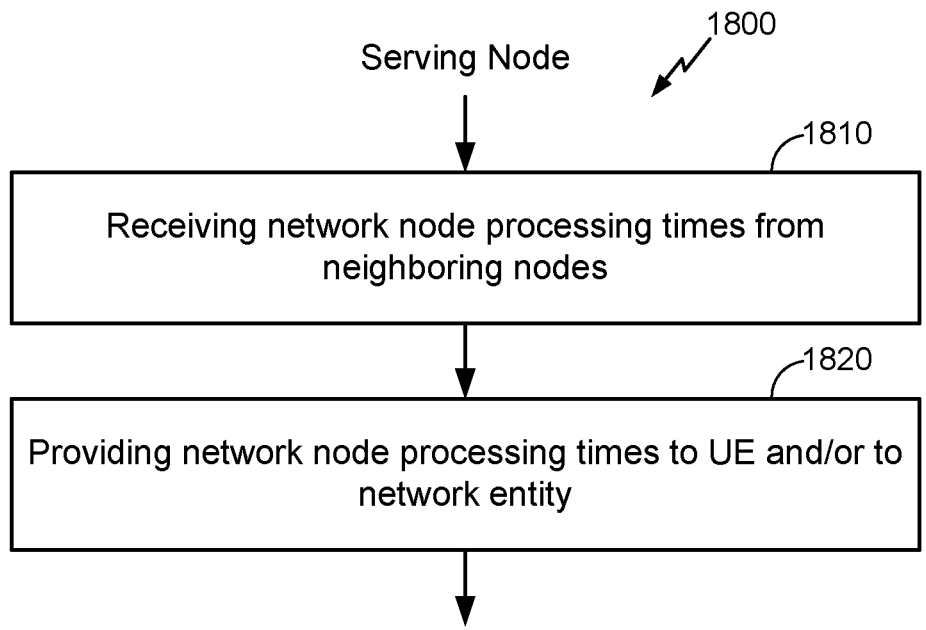

FIG. 18 illustrates an exemplary UE-centric method 1800 performed by the serving node to receive and provide network node processing times. To accommodate the UE positioning determination, the control signal sent in block 1730 of the method 1700 may notify the UE of a plurality of network nodes that will be transmitting corresponding plurality of RTTR signals to the UE. For example, the control signal can notify the UE of a plurality RTTR resources configured for the plurality of network nodes. The plurality of network nodes may be neighboring network nodes within communication range of the UE.

In an aspect, the memory component 340 of the apparatus 304 in FIG. 3 may be an example of an example of a non-transitory computer-readable medium storing computer-executable instructions of a network node to perform the method 1800. In another aspect, the method 1800 may be performed by the communication device 314, the processing system 334, and/or the memory component 340 of the apparatus 304 in FIG. 3.

In block 1810, the serving node may receive (e.g., through the X2 interface) a plurality of network node processing time from the plurality of neighboring nodes, where each neighboring node has calculated its network node processing time. In block 1820, the serving node may provide the network node processing times of the neighboring nodes and/or its own network node processing time to the UE and/or to the network entity.

In an aspect, the UE may adjust the bandwidth of the RTTM waveform (e.g., under direction of the serving node) enable the network nodes (serving and/or neighboring nodes) to measure the RTTM waveform arrival times $t_2$ to a required accuracy for RTT. The control signal sent in block 1730 of the method 1700 may specify a bandwidth of the RTTM waveform.

The RTTR waveform and the RTTR payload may be configured on different DL physical layer resources. For example, the DL PRS (e.g., CSIRS, SSB, etc.) may be configured (e.g., by the network entity and/or the serving node) for use as the RTTR waveform, and the PDCCH, or the PDSCH, or both may be configured (e.g., by the serving node) to carry RTTR payload. In such instances, the control signal sent to the UE in block 1730 of the method 1700 may explicitly indicate both the DL resource configured for the RTTR waveform and the DL resource configured for the RTTR payload.

There may be a QCL/spatialRelationInfo between the RTTR waveform and the RTTR payload. In other words, the DL physical layer resources for the RTTR waveform and for the RTTR payload may be configured in a manner such that the respective resources are offset from each other in time (e.g., fixed slot offset), or in frequency (e.g., fixed subcarrier offset), or both. In such a circumstance, the control signal sent in block 1730 of the method 1700 may explicitly indicate the resources configured for the RTTR waveform or for the RTTR payload, but need not explicitly indicate both.

In an aspect, the fixed slot offset and the fixed subcarrier offset may be predetermined. Alternatively or in addition thereto, the serving node may provide the offset values for one or both of the fixed slot offset and the fixed subcarrier offset through any one or more of RRC, MAC-CE, and DCI messages.

In an aspect, the RTTR waveform and the RTTR payload may be configured on same DL physical layer resources. In another aspect, RTTR payload may be configured on different DL physical layer resources.

Just as there can be a QCL/spatialRelationInfo between the RTTR waveform and the RTTR payload, there can also be a relationship between the configured RTTM and RTTR resources. In other words, the serving node may schedule the RTTM resources on the UL physical layer resources and schedule the RTTR resources on the DL physical layer resources with a known predetermined relationship to each other. In this instance, the control signal in block 1730 of the method 1700 need only explicitly indicate the RTTM resources or the RTTR resources, but does not need to explicitly specify both.

Figure 19:
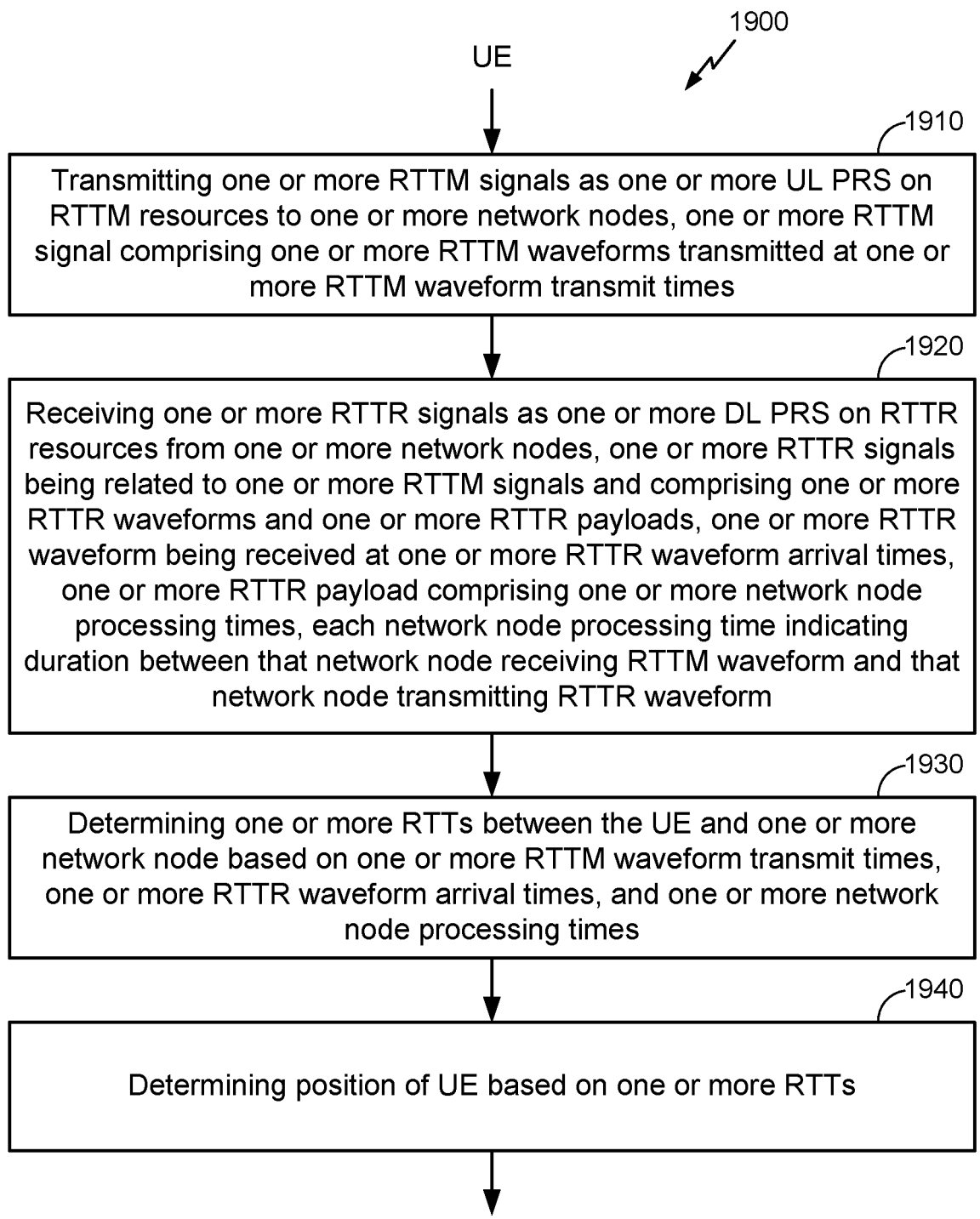
FIG. 19 illustrates an exemplary method performed by a UE according to an aspect of the disclosure.

FIG. 19 illustrates an exemplary UE-centric method 1900 performed by a UE. In an aspect, the memory component 338 of the apparatus 302 in FIG. 3 may be an example of an example of a non-transitory computer-readable medium storing computer-executable instructions of a UE to perform the method 1900. In another aspect, the method 1900 may be performed by the communication device 308 (which may be wired or wireless), the processing system 332, and/or the memory component 338 of the apparatus 304 in FIG. 3.

In block 1910, the UE may transmit one or more RTTM signals on RTTM resources to one or more network nodes. The one or more RTTM signals may comprise one or more RTTM waveforms transmitted from the UE at one or more RTTM waveform transmit times $t_1$. The RTTM resources may comprise uplink physical layer resources. For example, SSB may be configured for use as the RTTM waveform.

In block 1920, the UE may receive one or more RTTR signals on RTTR resources from the one or more network nodes. The one or more RTTR signals may be related to the one or more RTTM signals. They may also be related in a sense that the one or more RTTR signals are transmitted from the one or more network nodes in response to receiving the one or more RTTM signals. Further, the RTTM resources scheduled/configured on the UL physical layer resources and the RTTR resources scheduled/configured on the DL physical layer resources may have predetermined relationships to each other.

The one or more RTTR signals may each comprise a RTTR waveform and a RTTR payload. The RTTR resources may comprise downlink physical layer resources. For example, CSIRS, SSB, etc. may be configured for use as the RTTR waveform. This may also be an example of DL PRSs. As another example, PDCCH and/or PDSCH resources may be allocated to carry the RTTR payload. The PDCCH/PDSCH may be sized based on the payload.

The one or more RTTR waveforms may be received at one or more RTTR waveform arrival times $t_4$. Also, each RTTR payload may comprise network node processing time $(t_3-t_2)$ which indicates a duration between the network node receiving the RTTM waveform and the same network node transmitting the RTTR waveform, i.e., the difference between the RTTR waveform transmit time $t_3$ and the RTTM waveform arrival time $t_2$.

The RTTR waveform and payload may be configured to be carried on same DL physical layer resources. Alternatively, the RTTR waveform and payload may be configured to be carried on different DL physical layer resources. In an aspect, the RTTR payload may be received via one or more radio resource control (RRC) messages, one or more MAC control element (MAC-CE) messages, one or more downlink control indicator (DCI) messages, or any combination thereof.

Each RTTM waveform transmit time of an RTTR signal may be independent of other RTTR waveform transmit times of other RTTR signals. The network node may adjust the bandwidths of the RTTR waveforms to enable the UE to accurately measure their arrival times at the UE.

In block 1930, the UE may determine one or more RTTs based on the one or more RTTM waveform transmit times, one or more RTTR arrival times, and one or more network node processing times. In the simplest case, the UE may transmit one RTTM signal (hence only a single RTTM waveform transmit time) in block 1910 and receive one or more one or more RTTR signals in block 1920. In block 1940, the UE may determine its position based on the one or more RTTs.

Figure 20:
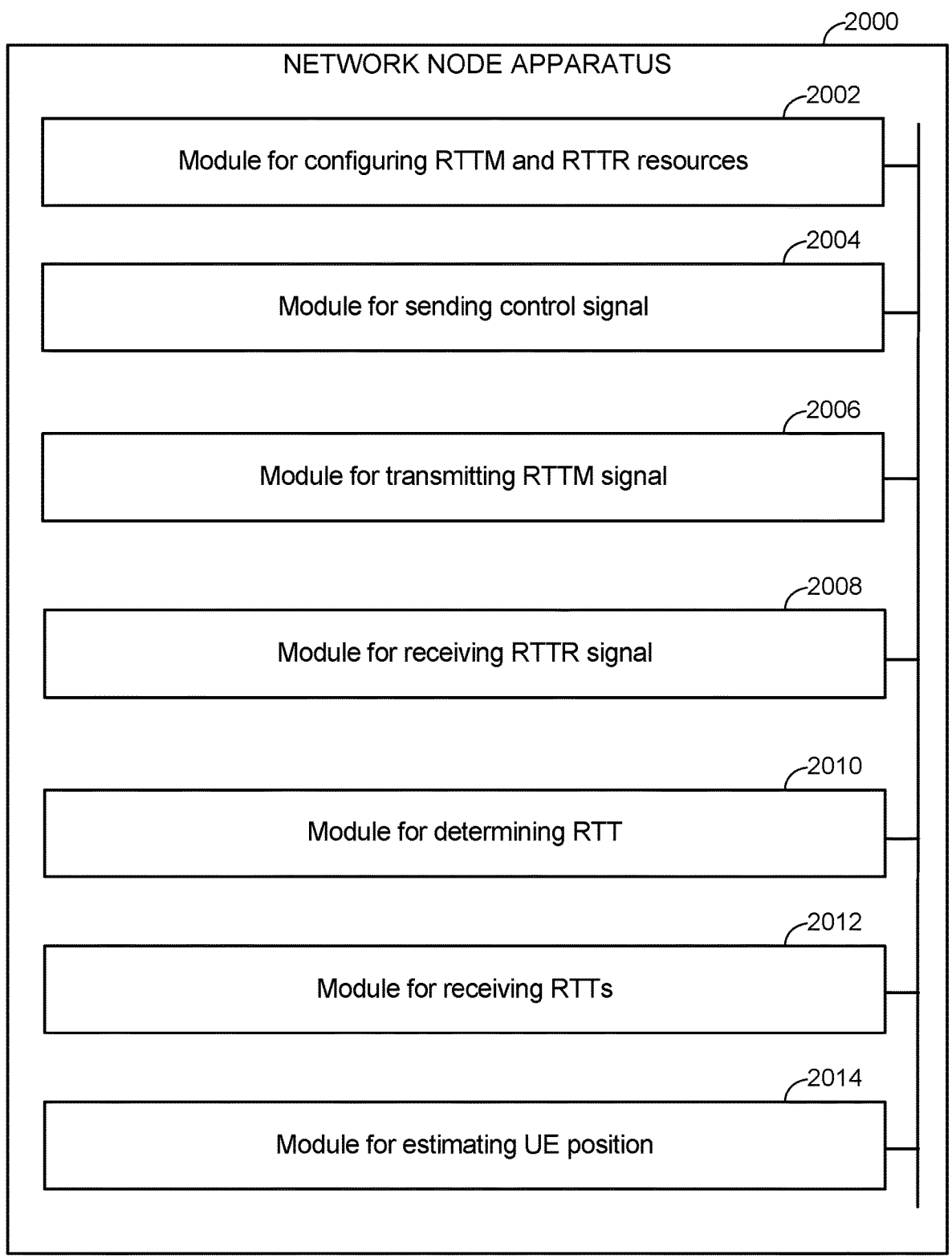
FIGS. 20-22 illustrate other simplified block diagrams of several sample aspects of apparatuses configured to support positioning and communication according to an aspect of the disclosure.

FIG. 20 illustrates an example network node apparatus 2000 (e.g., any of gNodeBs 202-206) configured to perform methods 900, 1000, 1100, 1200, 1500, 1600, 1700, and/or 1800 represented as a series of interrelated functional modules connected by a common bus. A module for configuring/scheduling RTTM and RTTR resources 2002 may correspond at least in some aspects to, for example, a processing system, such as processing system 334 in FIG. 3 and/or a memory system, such as memory component 340 in FIG. 3, as discussed herein. A module for sending control signal 2004 may correspond at least in some aspects to, for example, a communication device, such as communication device 314 in FIG. 3, and/or a processing system, such as processing system 334 in FIG. 3, as discussed herein. A module for transmitting RTTM signal 2006 may correspond at least in some aspects to, for example, a communication device, such as communication device 314 in FIG. 3, a processing system, such as processing system 334 in FIG. 3, and/or a memory system, such as memory component 340 in FIG. 3, as discussed herein. A module for receiving RTTR signal 2008 may correspond at least in some aspects to, for example, a processing system, such as processing system 334 in FIG. 3 and/or a memory system, such as memory component 340 in FIG. 3, as discussed herein. A module for determining RTT 2010 may correspond at least in some aspects to, for example, a processing system, such as processing system 334 in FIG. 3, a memory system, such as memory component 340 in FIG. 3, and/or a RTT determining system, such as RTT measurement component 453 in FIG. 3, as discussed herein. A module for receiving RTTs 2012 may correspond at least in some aspects to, for example, a processing system, such as processing system 334 in FIG. 3 and/or a memory system, such as memory component 340 in FIG. 3, as discussed herein. A module for estimating UE position 2014 may correspond at least in some aspects to, for example, a processing system, such as processing system 334 in FIG. 3 and/or a memory system, such as memory component 340 in FIG. 3, as discussed herein.

Figure 21:
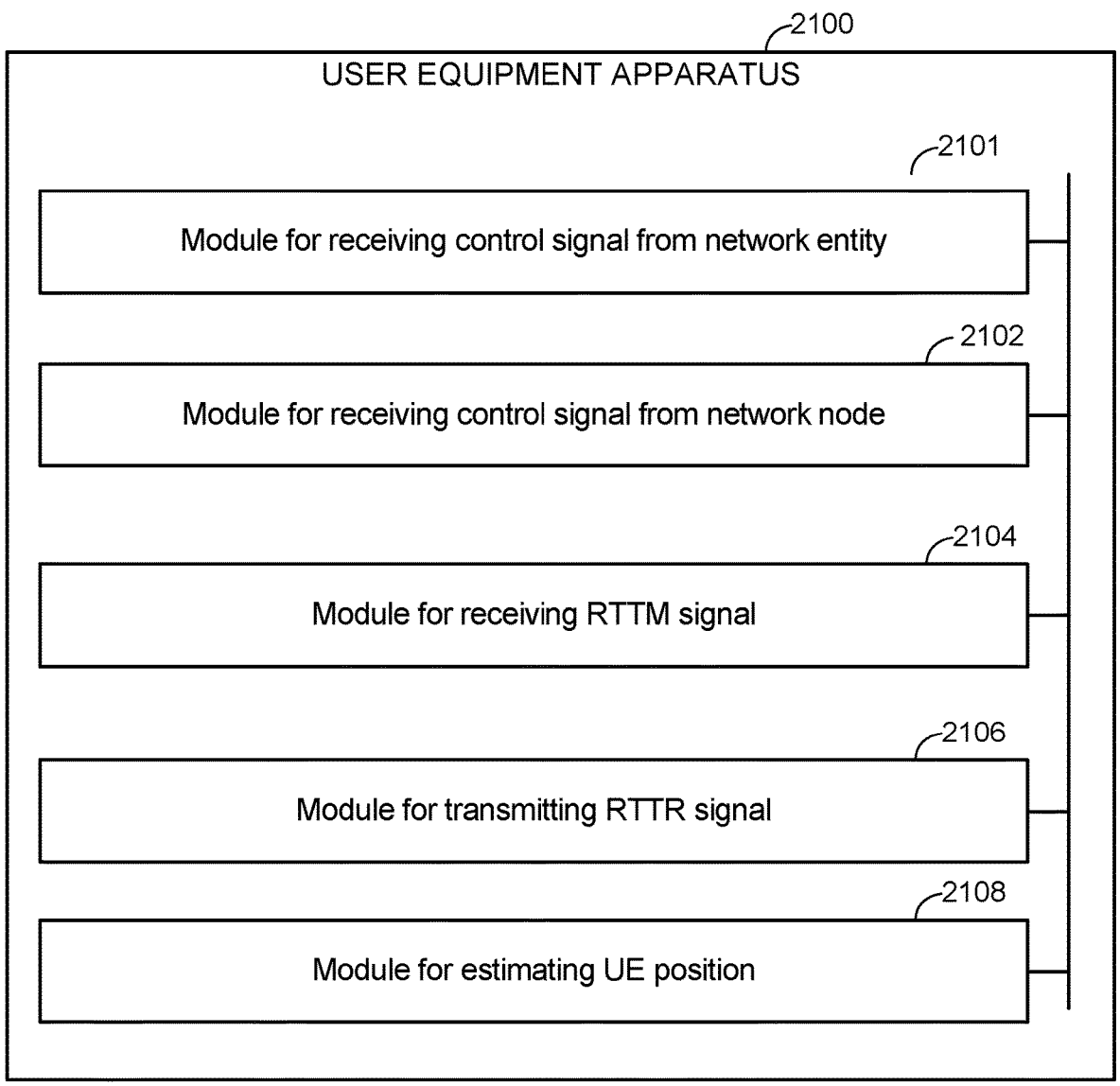

FIG. 21 illustrates an example user equipment apparatus 2100 represented configured to perform the methods 1300 and/or 1900 as a series of interrelated functional modules connected by a common bus. A module for receiving control signal from network entity 2101 may correspond at least in some aspects to, for example, a communication device, such as communication device 308 in FIG. 3, and/or a processing system, such as processing system 332 in FIG. 3 and/or a memory system, such as memory component 338 in FIG. 3, as discussed herein. A module for receiving control signal from network node 2102 may correspond at least in some aspects to, for example, a communication device, such as communication device 308 in FIG. 3, and/or a processing system, such as processing system 332 in FIG. 3 and/or a memory system, such as memory component 338 in FIG. 3, as discussed herein. A module for receiving RTTM signal 2104 may correspond at least in some aspects to, for example, a communication device, such as communication device 308 in FIG. 3, a processing system, such as processing system 332 in FIG. 3, and/or a memory system, such as memory component 338 in FIG. 3, as discussed herein. A module for transmitting RTTR signals 2106 may correspond at least in some aspects to, for example, a communication device, such as communication device 308 in FIG. 3, a processing system, such as processing system 332 in FIG. 3, and/or a memory system, such as memory component 338 in FIG. 3, as discussed herein. A module for estimating UE position 2108 may correspond at least in some aspects to, for example, a processing system, such as processing system 332 in FIG. 3 and/or a memory system, such as memory component 338 in FIG. 3, as discussed herein.

Figure 22:
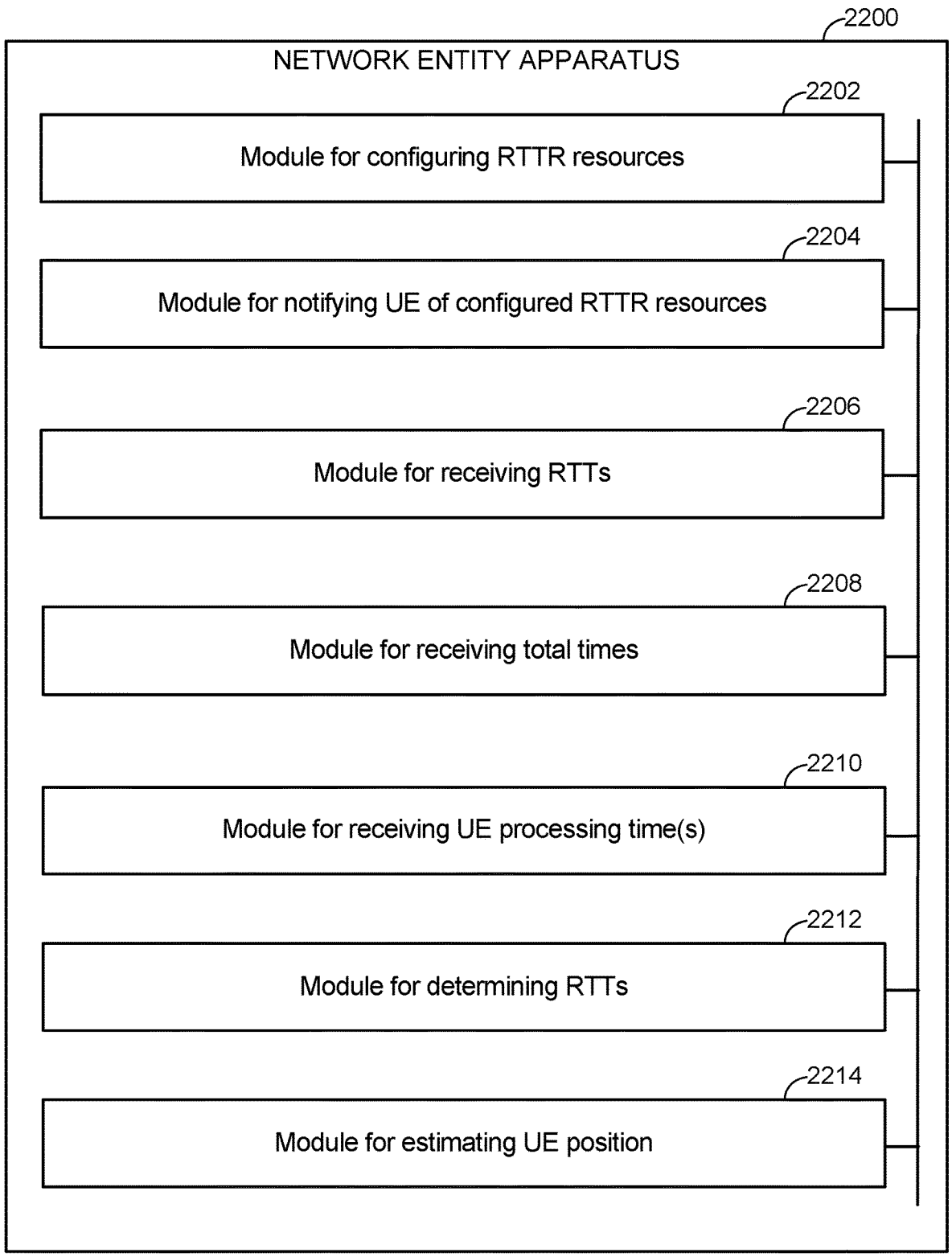

FIG. 22 illustrates an example network entity apparatus 2200 (e.g., LMF, location server, etc.) configured to perform method 1400 represented as a series of interrelated functional modules connected by a common bus. A module for configuring RTTR resources 2202 may correspond at least in some aspects to, for example, a processing system, such as processing system 336 in FIG. 3 and/or a memory system, such as memory component 342 in FIG. 3, as discussed herein. A module for notifying UE of configured RTTR resources 2204 may correspond at least in some aspects to, for example, a communication device, such as communication device 326 in FIG. 3, and/or a processing system, such as processing system 336 in FIG. 3, as discussed herein. A module for receiving RTTs 2206 may correspond at least in some aspects to, for example, a communication device, such as communication device 326 in FIG. 3, a processing system, such as processing system 336 in FIG. 3, and/or a memory system, such as memory component 342 in FIG. 3, as discussed herein. A module for receiving total times 2208 may correspond at least in some aspects to, for example, a communication device, such as communication device 326 in FIG. 3, a processing system, such as processing system 336 in FIG. 3 and/or a memory system, such as memory component 342 in FIG. 3, as discussed herein. A module for receiving UE processing times 2210 may correspond at least in some aspects to, for example, a communication device, such as communication device 326 in FIG. 3, a processing system, such as processing system 334 in FIG. 3, and/or a memory system, such as memory component 340 in FIG. 3, as discussed herein. A module for determining RTTs 2212 may correspond at least in some aspects to, for example, a processing system, such as processing system 334 in FIG. 3 and/or a memory system, such as memory component 340 in FIG. 3, as discussed herein. A module for estimating UE position 2214 may correspond at least in some aspects to, for example, a processing system, such as processing system 334 in FIG. 3 and/or a memory system, such as memory component 340 in FIG. 3, as discussed herein.

The functionality of the modules of FIGS. 19-22 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 19-22, as well as other components and functions described herein, may be implemented using any suitable means. Such means also may be implemented, at least in part, using corresponding structure as taught herein. For example, the components described above in conjunction with the "module for" components of FIGS. 19-22 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A network node, comprising:
   a transceiver, a memory, and a processor communicatively coupled with the transceiver and the memory,
   wherein the processor, the memory, and the transceiver are configured to:
      transmit a round trip time (RTT) measurement (RTTM) signal on RTTM resources to a user equipment (UE) at a RTTM transmit time, the RTTM signal comprising a channel state information reference signal (CSI-RS), a synchronization signal block (SSB), or a positioning reference signal (PRS);
      receive a RTT response (RTTR) signal on RTTR resources from the UE, the RTTR signal having at least one of a spatial relation, a pathloss reference relation, or quasi-colocation relation to the RTTM signal, the RTTR signal comprising a sounding reference signal (SRS) comprising an SRS signal and an SRS payload, the SRS signal being received at a RTTR arrival time, the SRS payload comprising a UE processing time indicating a duration between the UE receiving the RTTM signal and the UE sending the RTTR signal; and
      determine a RTT between the UE and the network node based on the RTTM transmit time, the RTTR arrival time, and the UE processing time.

2. The network node of claim 1,
   wherein the RTTM signal is one of a plurality of RTTM signals transmitted on a plurality of transmit beams of the network node, and
   wherein the RTTR signal is one of a plurality of RTTR signals received on a plurality of receive beams of the network node.

3. The network node of claim 1,
   wherein the network node is a serving node for the UE, and
   wherein the processor, the memory, and the transceiver are further configured to:
      configure the RTTM resources for transmitting the RTTM signal to the UE, the RTTM resources comprising DL physical layer resources;
      configure the RTTR resources for receiving the RTTR signal from the UE, the RTTR resources comprising UL physical layer resources; and
      send a control signal to notify the UE of the configured RTTM resources, RTTR resources, or both.

4. The network node of claim 3,
   wherein the control signal notifies the UE of one or more RTTM resources configured for one or more network nodes neighboring the serving node to transmit one or more RTTM signals to the UE, and
   wherein the RTTR resources configured for the RTTR is signal comprise SRS payload resources sufficient to carry one or more UE processing times corresponding to the one or more RTTM signals.

5. The network node of claim 4, wherein the processor, the memory, and the transceiver are further configured to:
   receive one or more RTTs from the one or more network nodes, each RTT being a RTT between the UE and one of the one or more network nodes; and one or both of:
　　estimate a position of the UE based on the one or more RTTs and the RTT between the UE and the serving node; and
　　provide, to a network node, the one or more RTTs and/or the RTT between the UE and the serving node.

6. The network node of claim 3, wherein the UL physical layer resources on which the SRS signal is configured are different from the UL physical layer resources on which the SRS payload is configured.

7. The network node of claim 6, wherein a physical uplink control channel (PUCCH) is configured to carry the SRS payload.

8. The network node of claim 3, wherein some of the UL physical layer resources on which the SRS signal is configured are used instead for the SRS payload.

9. The network node of claim 3, wherein the SRS payload is conveyed through SRS sequences, or through SRS cyclic shifts, or both.

10. The network node of claim 3,
　　wherein the RTTM resources are configured on the DL physical layer resources and the RTTR resources are configured on the UL physical layer resources with a predetermined relationship to each other, and
　　wherein the control signal explicitly indicates the configured RTTM resources, or the configured RTTR resources, but not both.

11. The network node of claim 1, wherein the processor, the memory, and the transceiver are further configured to provide, to another network node and/or to a serving node, the RTT between the UE and the network node.

12. The network node of claim 1, wherein the SRS payload is received via one or more radio resource control (RRC) messages.

13. A user equipment (UE), comprising:
　　a transceiver, a memory, and a processor communicatively coupled with the transceiver and the memory,
　　wherein the processor, the memory, and the transceiver are configured to:
　　　　receive a round trip time (RTT) measurement (RTTM) signal on RTTM resources from a network node at a RTTM arrival time, the RTTM signal comprising a channel state information reference signal (CSI-RS), a synchronization signal block (SSB), or a positioning reference signal (PRS); and
　　　　transmit a RTT response (RTTR) signal on RTTR resources to the network node, the RTTR signal having at least one of a spatial relation, a pathloss reference relation, or quasi-colocation relation to the RTTM signal, the RTTS signal comprising a sounding reference signal (SRS) comprising an SRS signal and an SRS payload, the SRS signal being transmitted at a RTTR transmit time, the SRS payload comprising a UE processing time indicating a duration between the UE receiving the RTTM signal and the UE sending the RTTR signal.

14. The UE of claim 13,
　　wherein the RTTM signal is one of a plurality of RTTM signals received on a plurality of receive beams of the UE, and
　　wherein the RTTR signal is one of a plurality of RTTR signals transmitted on a plurality of transmit beams of the UE.

15. The UE of claim 13, further comprising:
receiving, from a network node, a control signal notifying the UE of RTTR resources configured for transmitting one or more RTTR signals from the UE to one or more network nodes.

16. The UE of claim 13, further comprising:
receiving, from a serving node, a control signal notifying the UE of the RTTM resources and of the RTTR resources, the RTTM resources comprising DL physical layer resources configured for receiving one or more RTTM signals from one or more network nodes, and the RTTR resources comprising UL physical layer resources configured for transmitting one or more RTTR signals to one or more network nodes.

17. The UE of claim 16,
　　wherein the control signal notifies the UE of one or more RTTM resources configured for one or more network nodes neighboring the serving node to transmit one or more RTTM signals to the UE, and
　　wherein one or more UE processing times corresponding to the one or more RTTM signals are transmitted on the RTTR resources configured for the RTTR signals.

18. The UE of claim 16, wherein the RTTR signal also includes one or more DL timing reports corresponding to the one or more network nodes, each DL timing report indicating a change in DL timing from the corresponding network node detected by the UE.

19. The UE of claim 16, wherein the UL physical layer resources on which the SRS signal is configured are different from the UL physical layer resources on which the SRS payload is configured.

20. The UE of claim 19,
　　wherein the UL physical layer resources for the SRS signal and the UL physical layer resources for the SRS payload are configured to be offset from each other in time by a fixed slot offset, or in frequency by a fixed carrier offset, or both, and
　　wherein the control signal sent explicitly indicates only one of the UL physical layer resources configured for the SRS signal and the UL physical layer resources configured for the SRS payload.

21. A network node, comprising:
　　a transceiver, a memory, and a processor communicatively coupled with the transceiver and the memory,
　　wherein the processor, the memory, and the transceiver are configured to:
　　　　receive a round trip time (RTT) measurement (RTTM) signal on RTTM resources from a user equipment (UE) at a RTTM arrival time, the RTTM signal comprising a positioning reference signal (PRS); and
　　　　transmit a RTT response (RTTR) signal on RTTR resources to the network node, the RTTR signal having at least one of a spatial relation, a pathloss reference relation, or quasi-colocation relation to the RTTM signal, the RTTR signal comprising a sounding reference signal (SRS) comprising an SRS signal and an SRS payload, the SRS signal being transmitted at a RTTR transmit time, the SRS payload comprising a network node processing time indicating a duration between the network node receiving the RTTM signal and the network node sending the RTTR signal.

22. The network node of claim 21, further comprising:
receiving, from another network node, a control signal notifying the network node of RTTR resources configured for transmitting one or more RTTM signals to the UE.

23. The network node of claim 21,
wherein the network node is a serving node for the UE, and
wherein the processor, the memory, and the transceiver are further configured to:
- configure the RTTM resources for one or more other network nodes neighboring the serving node to receive one or more RTTM signals from the UE, the RTTM resources comprising UL physical layer resources;
- configure the RTTR resources for the one or more other network nodes to transmit one or more payloads to the UE, the RTTR resources comprising DL physical layer resources; and
- send a control signal to notify the UE of the configured RTTM resources, the configured RTTR resources, or both.

24. A user equipment (UE), comprising:
a transceiver, a memory, and a processor communicatively coupled with the transceiver and the memory,
wherein the processor, the memory, and the transceiver are configured to:
- transmit one or more round trip time (RTT) measurement (RTTM) signals on RTTM resources to one or more network nodes, the one or more RTTM signals being transmitted at one or more RTTM transmit times;
- receive one or more RTT response (RTTR) signals on RTTR resources from the one or more network nodes, the one or more RTTR signals having at least one of a spatial relation, a pathloss reference relation, or quasi-colocation relation to the one or more RTTM signals, the one or more RTTR signals comprising one or more sounding reference signals (SRSs), each SRS comprising an SRS signal and an SRS payload, the one or more SRS signals being received at one or more RTTR arrival times, the one or more SRS payloads comprising one or more network node processing times, each network node processing time indicating a duration between that network node receiving the RTTM signal and the network node sending the RTTR signal;
- determine one or more RTTs between the UE and the one or more network nodes based on the one or more RTTM transmit times, the one or more RTTR arrival times, and the one or more network node processing times; and
- determine a position of the UE based on the one or more RTTs.

25. The UE of claim 24, wherein the processor, the memory, and the transceiver are further configured to provide, to a network node different from the one or more network nodes, the one or more RTTs.

26. The UE of claim 24, wherein UL physical layer resources on which at least one RTTR signal is configured are different from UL physical layer resources on which the corresponding RTTR payload is configured.

* * * * *